(12) United States Patent
Miller

(10) Patent No.: US 9,681,640 B2
(45) Date of Patent: Jun. 20, 2017

(54) WASTE PAD

(71) Applicant: Martin Miller, New York, NY (US)

(72) Inventor: Martin Miller, New York, NY (US)

(*) Notice: Subject to any disclaimer, the term of this patent is extended or adjusted under 35 U.S.C. 154(b) by 0 days.

(21) Appl. No.: 15/176,145

(22) Filed: Jun. 7, 2016

(65) Prior Publication Data

US 2016/0286754 A1 Oct. 6, 2016

Related U.S. Application Data

(63) Continuation of application No. 14/628,264, filed on Feb. 22, 2015, now Pat. No. 9,357,746, which is a continuation-in-part of application No. 13/621,177, filed on Sep. 15, 2012, now Pat. No. 8,960,127.

(60) Provisional application No. 61/535,848, filed on Sep. 16, 2011.

(51) Int. Cl.
| | |
|---|---|
| *A01K 1/01* | (2006.01) |
| *A01K 1/015* | (2006.01) |
| *A01K 23/00* | (2006.01) |
| *B32B 5/02* | (2006.01) |
| *B32B 27/06* | (2006.01) |
| *B32B 27/32* | (2006.01) |

(52) U.S. Cl.
CPC .......... *A01K 1/0157* (2013.01); *A01K 1/0107* (2013.01); *A01K 1/0125* (2013.01); *A01K 23/005* (2013.01); *B32B 5/022* (2013.01); *B32B 27/06* (2013.01); *B32B 27/32* (2013.01); *B32B 2305/20* (2013.01); *B32B 2307/7265* (2013.01); *B32B 2307/758* (2013.01)

(58) Field of Classification Search
CPC .. A01K 1/0107; A01K 1/0125; A01K 23/005; A01K 1/015; A01K 1/0157; A01K 1/01; B65D 33/28
USPC ....... 119/161, 169, 171, 165, 167, 170, 172; 383/4, 75; 294/1.3
See application file for complete search history.

(56) References Cited

U.S. PATENT DOCUMENTS

| | | | | |
|---|---|---|---|---|
| 3,626,900 | A * | 12/1971 | Failla ................... | A01K 23/005 119/161 |
| 4,156,400 | A * | 5/1979 | Migdal ................ | A01K 23/005 119/161 |
| 4,646,685 | A * | 3/1987 | Arenz .................. | A01K 1/0125 119/168 |
| 4,800,677 | A * | 1/1989 | Mack ................... | A01K 1/0107 119/161 |
| 4,869,204 | A * | 9/1989 | Yananton ............. | A01K 1/0107 119/165 |

(Continued)

*Primary Examiner* — Trinh Nguyen
(74) *Attorney, Agent, or Firm* — Harvey Lunenfeld

(57) ABSTRACT

A pet waste collection apparatus having an absorbent pad having opposing outermost layers, comprising a permeable layer and an opposing substantially leak proof layer; the absorbent pad comprising at least one innermost layer of waste absorbing material sandwiched and completely enclosed between the opposing outermost layers and completely filling a volume therebetween extending to the outer peripheral border, which has an interior passageway, a draw tape therein, and a plurality of outside cut off corners having adjacent interior passageway openings; the draw tape having a length greater than that of the outer peripheral border; the draw tape routed through the adjacent interior passageway openings exposing the draw tape at the outside cut off corners; the waste collection apparatus forming a bag, when the draw tape is pulled taut.

12 Claims, 23 Drawing Sheets

(56) References Cited

U.S. PATENT DOCUMENTS

| | | | | |
|---|---|---|---|---|
| 4,938,607 | A | * | 7/1990 | Kelley .................... B65D 31/00 190/1 |
| 5,062,392 | A | * | 11/1991 | Lavash ................ A01K 1/0114 119/167 |
| 5,178,426 | A | * | 1/1993 | David ................... A01K 23/005 119/161 |
| 5,630,376 | A | * | 5/1997 | Ochi .................... A01K 1/0107 119/169 |
| 5,850,798 | A | * | 12/1998 | Engel ................... A01K 1/0107 119/170 |
| 6,976,451 | B2 | * | 12/2005 | Helfman .............. A01K 1/0107 119/169 |
| 8,042,688 | B2 | * | 10/2011 | Parks ....................... A45C 9/00 128/849 |
| 2005/0109284 | A1 | * | 5/2005 | Helfman .............. A01K 1/0107 119/161 |
| 2010/0307422 | A1 | * | 12/2010 | Huck ................... A01K 1/0152 119/161 |

* cited by examiner

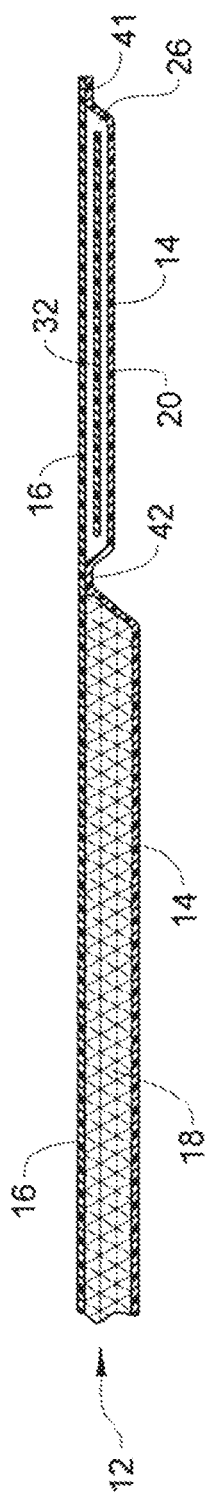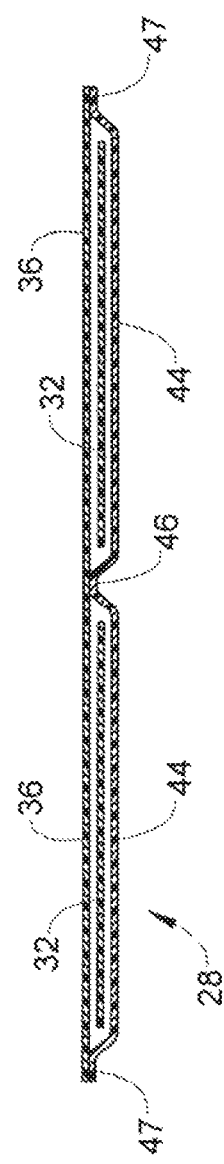

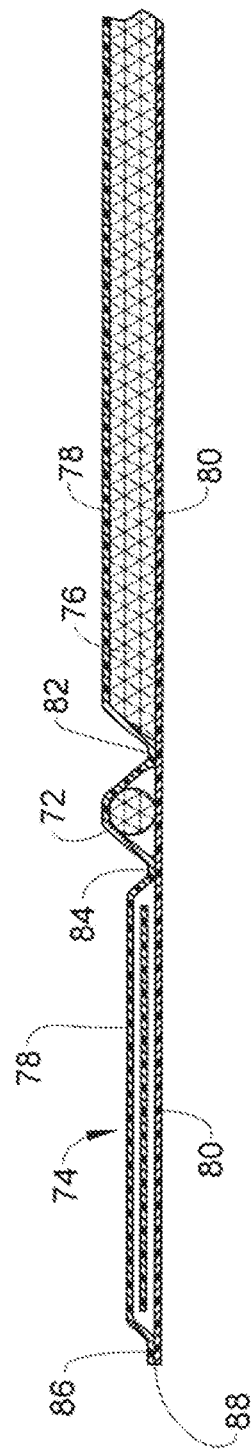

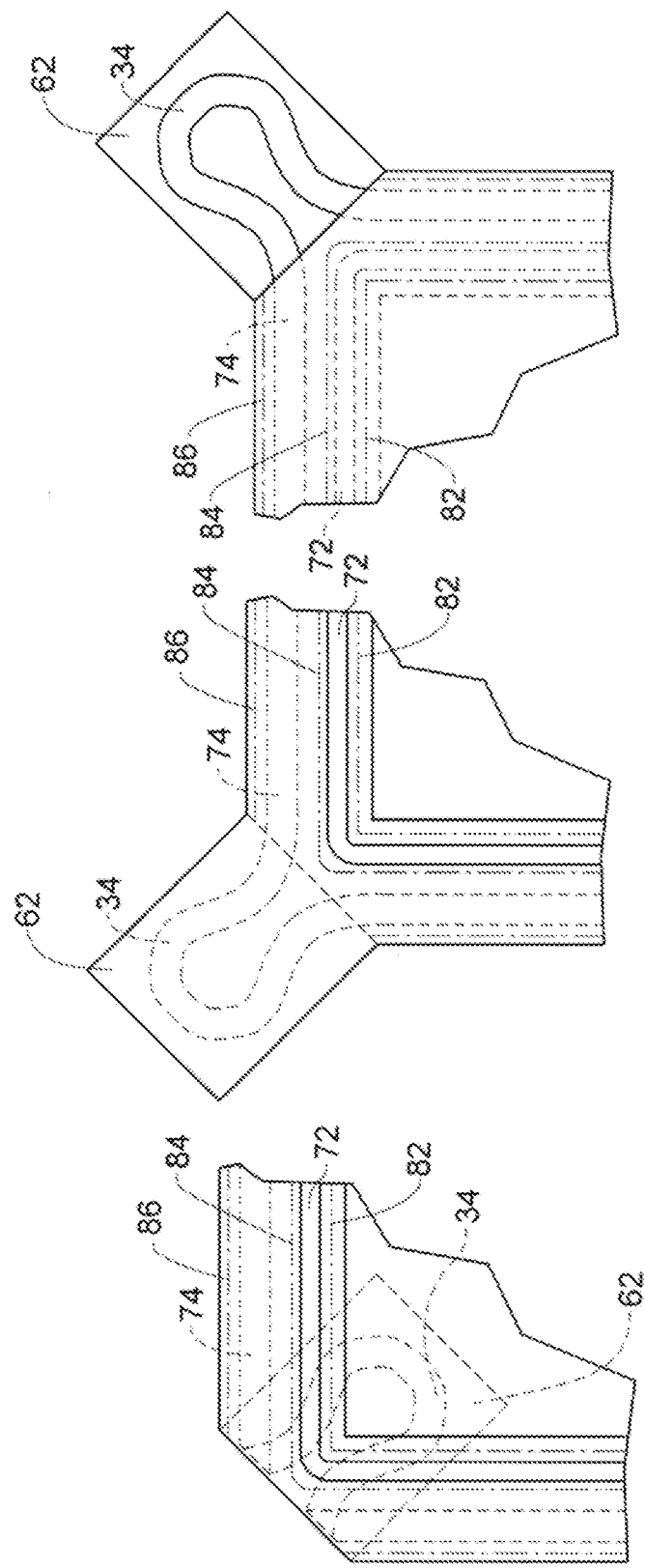

WASTE PAD

This application is a continuation of U.S. patent application Ser. No. 14/628,264, filed Feb. 22, 2015, which is a continuation-in-part of U.S. patent application Ser. No. 13/621,177, filed Sep. 15, 2012, now U.S. Pat. No. 8,960,127, which claims the benefit of U.S. Provisional Application No. 61/535,848, filed Sep. 16, 2011, the full disclosures of which all are incorporated herein by reference. The above referenced documents are not admitted to be prior art with respect to the present invention by their mention herein.

BACKGROUND OF THE INVENTION

Field of the Invention

The present invention relates generally to pet waste pads for pet waste collection and disposal and more particularly to pet waste pads having drawstrings for enclosing and sealing collected pet wastes into a bag for disposal.

Background Art

Throughout history humans had pets of varying kinds. Dogs, for example, are considered to have been domesticated from gray wolves approximately 15,000 years ago, although remains of domesticated dogs have been found that date back 33,000 years. DNA testing, on the other hand, suggests an evolutionary split between dogs and wolves approximately 100,000 years ago. Cats, however, have been shown in drawings and sketches dating back more than 9,500 years. Of course, humans had other pets, such as monkeys, guinea pigs, reptiles, and other assorted animals, based upon cultural norms of the time. Although it is not known exactly when humans started keeping animals as pets, dogs are thought to be one of the first animals domesticated by humans for such purposes.

As humans started keeping pets as companions and/or as work animals in their living quarters, and human knowledge of hygiene improved and the need for improved sanitary conditions became known, there became a need for improved sanitation for pets coexisting in living quarters with their human guardians. This became especially important during early stages of life of the pets, and the need to train the pets and/or work animals not to defecate and/or urinate within the living quarters became an important chore and training exercise for their human guardians.

Pet waste pads and the like have been known. In more recent times, pet waste pads were developed to attract the pets and, in particular, dogs and/or puppies to an area, such as a pet waste pad for the pets, dogs and/or puppies to defecate and/or urinate on, while minimizing deposits of such wastes in undesired parts of the living quarters. The pet waste pads could then be picked up with the excrement thereon. However, to this day, disposal of such deposits of fecal matter and/or urine remains an unsanitary, unhygienic, and potentially pathogenically harmful. In many such instances, the human guardians may come into contact with such exposed excrement and/or urine, either from spilling such wastes or touching such wastes during carrying and/or disposal of the pet waste pads.

Pet waste collection apparatus that facilitate the hygienic collection and hygienic disposal of collected pet waste are necessary. A pet waste collection apparatus that is capable of collecting and facilitating disposal of collected feces and urine without a human handler contacting such collected wastes is needed.

The pet waste collection apparatus should be capable of attracting a young animal, dog, or other pet, to the pet waste collection apparatus for defecation and urination thereon, without the young animal, dog, or other pet substantially damaging the pet waste collection apparatus. A pet waste collection apparatus is necessary that comprises a substantially leak proof absorbent pad, which may be placed on a surface for receiving and collecting excrement and/or urine from the young animal, dog, or other pet, that can be easily formed into a bag by pulling a drawstring taut, when a sufficient amount of excrement and/or urine is collected.

The pet waste collection apparatus should be easy to use, handle, and dispose of in a hygienic and environmentally friendly manner, durable, damage resistant, leak proof, and inexpensive to manufacture.

Different pet waste collection pads, devices and the like have heretofore been known. However, none of the pet waste collection pads, devices and the like adequately satisfies these aforementioned needs.

U.S. Pat. No. 5,630,376 (Ochi, et al.) discloses an absorbent composite panel for a pet animal, comprising a liquid-absorbent panel and a liquid-impermeable backsheet, wherein the top surface of the absorbent panel is partially covered along its peripheral edge with liquid-impermeable overflow barrier strips, which are bonded integrally to the backsheet along outer side edges. Inner side edge of the overflow barrier strips are spaced from the top surface of the absorbent panel by a spacer.

U.S. Pat. No. 6,244,216 (Ochi) discloses a sheet for pet excretion, including a liquid permeable front face sheet, a liquid impermeable rear face sheet and an absorbent body interposed between the front face sheet and the rear face sheet. A liquid absorbent region where the absorbent body exists has a colored portion positioned at the center thereof and a non-colored portion adjoining the colored portion so as to enclose an entire periphery of the colored portion.

U.S. Patent Application Publication No. 2008/0236504 (Silverman) a pet waste collection pad for use in training an animal, such as a domestic pet, to urinate or defecate in a predetermined location. The pet waste collection pad includes a support frame and a liquid retaining layer mounted above the support frame. The support frame provides structural rigidity to retain the pad in a flattened state. The collection pad is deformable from a first undeformed shape having a first size to a second deformed shape having a second size smaller than the first size. The support frame may comprise a perforated sheet having foldable seams allowing the pet waste collection pad to be folded. The pet waste collection pad may also be rolled into a cylindrical shape to facilitate handling.

U.S. Pat. No. 5,178,426 (David, et al.) discloses a disposable combination pad and bag device for pet excrements that has a generally symmetrical shape with spaced corners and connecting peripheral edges, defining a broad area suited to be laid out flat on the ground with outermost peripheral edges. Narrow elongated generally stiff reinforcing strips are secured along their lengths to the pad and respectively extend generally inboardly from pad corners toward a pad interior region to be spaced apart only slightly at their inboard ends, thereby defining a small nonreinforced interior pad region that can be folded over and around any pet excrements on the pad when forming a carrying bag. Flexible handles are connected off the reinforcing strips and extended outboardly beyond the peripheral pad edges at the corners, and have inside openings sized for finger hooking by the person walking the pet, for suspended carriage of the pad when formed to the carrying bag.

U.S. Pat. No. 3,626,899 (Spellman) discloses a training pad for young dogs that has absorbent material lined on one side thereof with fluid impervious material, which is impregnated with an odor imparting substance that attracts young dogs to the pad for the purpose of urination and defecation and discourages chewing of the pad by the young dogs.

U.S. Pat. No. 6,976,451 (Helfman) and U.S. Patent Application Publication No. 2005/0109284 (Helfman) disclose an animal waste collection pad, comprising: a backing sheet of fluid impervious material, one or more absorbent sheets overlying the backing sheet, a top sheet overlying the absorbent sheet(s) and integrated tie means along one dimension of the collection pad. The tie means form ties for carrying and tying the collection pad into a compact bundle for disposal.

U.S. Pat. No. 4,800,677 (Mack) discloses an animal waste collection pad having a backing sheet of fluid impervious material and a non-woven top sheet thereon. An absorbent pad is disposed on the backing sheet, and the absorbent pad contains a scent attractive to dogs. The scent may be provided by a frangible capsule, a micro encapsulated scent incorporated in the pad, or a spray applied to the pad. Tapes or drawstrings are attached to the backing sheet for tying the animal waste collection pad into a small compact package for disposal.

U.S. Pat. No. 3,284,273 (Prentice) discloses an absorbent pad, in which a laminated floor pad is provided for standing support and for storing liquid contacting the same and including: a base lamina of liquid absorbent paper felt with an impervious film on its lowermost supported face; a top surface lamina of liquid absorbent paper felt spaced from and overlying the base lamina; a marginal spacer separating the laminae with a chamber space therebetween; and a liquid retaining lamina comprised of a single layer of loose liquid saturable crush resistant pellets occupying the chamber space between the laminae and engageably supporting the surface laminae, in order to uniformly space the first two mentioned laminae and to receive liquid therefrom and to store the liquid.

U.S. Pat. No. 8,042,489 (Takahashi, et al.) discloses an animal waste collection sheet for inhibiting leakage of urine, unclean appearance and a damp or cold surface, without increasing the thickness and weight of the top sheet unnecessarily, thus improving the handling property thereof. The animal waste collection sheet is planar and comprises a top sheet that is liquid permeable, a back sheet that is liquid impermeable, and an absorbent sheet disposed between the top sheet and the back sheet. The top sheet comprises a non-woven fabric with convex and concave portions on the surface thereof. The top sheet is preferably a non-woven fabric alternately having a plurality of groove portions and a plurality of convex portions formed in a fixed direction.

U.S. Pat. No. 3,626,900 (Failla) discloses a disposable dog commode, comprising a preferably square, flexible sheet of moisture proof material adapted to be spread upon a flat supporting surface, such as a floor, pavement or the like, and to be held in position while the dog uses the same, followed by contraction of the edges and corners of the sheet to enclose excrement for disposal in a suitable waste receptacle. The disposable dog commode is preferably formed from a sheet of flexible, moisture proof or waterproof material, such as waterproof synthetic resin sheet materials, thin waterproof paper, or metal foil. The edges of the sheet of material are folded in upon one surface of the sheet to form hems along each edge. The hems contain a drawstring, and the ends thereof extend through a diagonal slit at one corner of the disposable dog commode.

U.S. Pat. No. 4,646,685 (Arenz) discloses a disposable litter box and sheet assembly, including a litter box and sheet assembly, a panel of box-forming material, and a sheet secured to a central portion of the panel. The panel has side and end flaps free of the sheet, which may be folded upwardly from a central portion of the panel to form a litter box for cats. The sheet may be of a plastic material. The sheet is flexible and may resemble the sheet material used in the manufacture of plastic disposal bags. At edges of the sheet, the edges are folded over and secured to the remainder of the sheet, whereby an internal channel is provided extending about margins of the sheet for the reception of a drawstring.

U.S. Pat. No. 4,884,526 (Giannakopoulos) discloses a disposable kitty litter box and bag assembly in which the box with litter is inside the bag. The bag wall is long enough to be gathered together at the top and tied shut with the box and used kitty litter closed inside. The entire assembly is then disposed of together as a unit. The part of the bag wall which extends upwardly beyond the wall of the box inside is doubled back in folds and held in place by a band or other releasable retaining device, until the litter has been used and the entire assembly is ready for disposal. At such time, the band is removed or separated to allow the folds of the bag wall to be unfolded and lifted above the box and litter for closing and tying shut.

U.S. Pat. No. 4,872,420 (Shepard) discloses a disposable cat litter box, comprising a liner pan for receiving cat litter, with the liner pan having an open top, bottom, and sides and cat litter disposed in the liner pan. A disposal bag having an opening at least equal to the bottom of the liner pan and a drawstring around the opening is attached to the bottom of the exterior of the liner pan with the opening of the disposal bag around the sides of the liner pan. A covering lid is secured to the top of the liner pan to hold the cat litter inside the liner pan with a tear cord for removing the lid from the liner pan to expose the cat litter during use. After use, pulling on the drawstring causes the opening of the bag to cover the open top and fully enclose the liner pan and any used cat litter therein.

U.S. Pat. No. 6,532,897 (Adolfsson, et al.) discloses a sanitary device for domestic animals, comprising a container and at least one liquid absorbing unit, which is arranged to be placed in the container and which after use is arranged to be removed from the container in order to be replaced by a new liquid absorbing unit. The liquid absorbing unit comprises at least a first liquid absorbing material which is substantially sheet-shaped and comprises at least one stamped out form. When the liquid absorbing unit is arranged to be used, at least one area of the stamped out form is gripped and lifted upwards, whereafter the area is mixed with other areas of the stamped out form, such that an airy layer is formed in the container.

U.S. Pat. No. 4,156,400 (Migdal) discloses an animal feces disposal device that includes a thin flexible sheet of water repellent material, which has a stiffening member centrally mounted to it. A drawstring running about the periphery of the sheet serves to close the sheet after use. The stiffening member is arranged so that the feces will be centrally positioned within the device to avoid any hand contact by the user. After use the device may be disposed of as a unit.

U.S. Pat. No. 4,869,204 (Yananton) discloses an odorless animal litter unit having securing means, in which a claw resistant sorbent pad laminate is employed for the collection of animal urine. The laminate includes a bottom sheet layer of moisture impermeable material, an intermediate sorbent layer of material having a high sorbency capacity for urine, and a top claw resistant screen means. The laminate is secured to a container by means of securing means around the periphery of the bottom sheet layer. In one embodiment of the invention, the securing means is an elasticized area or areas around the periphery of the moisture impermeable material. In an alternate embodiment, a drawstring is movably affixed to the periphery of the bottom sheet layer.

U.S. Pat. No. 7,249,570 (Roberson) discloses a disposable nonskid absorbent pad for a pet that includes a training pad having a plurality of material layers to retain fluids and solid material; while preventing passage therethrough. A top layer serves as absorbent material, with the bottom layer forming a fluid impermeable layer to prevent passage of liquids. The impermeable layer extends over a peripheral edge of the top absorbent layer, forming a hem that is colored green to simulate grass. On the underside of the bottom layer, a plurality of adhesive or frictional members are fastened thereto for preventing movement, in whole or in part, from the selective placement of the pad. Optionally, a fragrance layer can be incorporated into the pad between the fluid impermeable base layer and the top absorbent layer to attract pets to the pad.

U.S. Pat. No. 8,042,490 (Takahashi, et al.) discloses an animal waste collection sheet that is planar and includes a top sheet, which is liquid permeable, a back sheet which is liquid impermeable, and an absorbent sheet disposed between the top sheet and the back sheet. The top sheet has a high fiber density region in a thickness direction thereof, with a fiber density higher than an average fiber density of the top sheet, at least in a part of a side facing the absorbent sheet.

U.S. Pat. No. 7,763,338 (Olivadoti) discloses a retaining apparatus for a pet waste pad, including a retaining apparatus for retaining a liquid-absorptive sheet that includes a lower layer and an upper layer having substantially the same dimensions as the lower layer. Sandwiched between the two layers are a first plurality of magnetic members arranged along the perimeter of the lower layer and a second plurality of magnetic members, opposite in polarity to the first plurality of magnetic members, arranged adjacent to the first plurality of magnetic members.

U.S. Pat. No. 7,748,348 (Hurwitz) discloses a compact foldable animal litter pan with disposable adhesive waste collection sheets, including a collapsible animal litter pan having polymeric surfaces that are considered to be immune to urine soaking A plurality of hinges collapse and expand the litter pan. The litter pan has sidewalls that locate, receive and stabilize a urine absorption sheet. The urine absorption sheet has a liquid impervious bottom layer, a urine absorption layer composed of cotton, cellulose fluff pulp, commuted pulp, soft wood fine chips, or hydrophilic paper and combinations thereof, together with superabsorbent polymers and a top, liquid permeable, layer. The top and bottom layers are bonded to constrain the urine absorbent layer. An adhesive coating is applied to the bottom layer of the urine absorption sheet for temporarily adhering the sheet to the foldable litter pan for enhanced stability of the urine absorption sheet. Animal urine is substantially absorbed by the urine absorbent sheet, and the soiled sheet may be replaced with a fresh sheet, with the objective of not soiling the litter pan.

U.S. Pat. No. 6,745,894 (Dean) discloses a waste removal device for collecting waste material. The waste removal device comprises a first sheet having an inner surface and a second sheet attached to the first sheet and overlying the inner surface to define an envelope for storing the waste material. The waste removal device includes a third sheet made from an absorbent material that overlies the inner surface of the first sheet adjacent to the second sheet. The third sheet is intended to contact the waste material, while the waste removal device is being used, and the first sheet is intended to provide added protection to a user, by protecting the user from the waste material.

U.S. Pat. No. 6,550,423 (Pope) discloses an absorbent dog waste disposal pad holder lacking an underlying bottom wall and having nestable upper and lower frames that cooperate to form a peripheral wall to securely hold the periphery of a disposable, absorbent pad therebetween. Each nestable upper and lower frame comprises first and second frame members. The first and second frame members of the lower frame preferably comprise opposite side ends that interlock to form the lower frame. The first and second frame members of the upper frame preferably comprise ends that abut to form the upper frame. Preferably, the frames of the absorbent dog waste disposal pad holder are generally rectangular shaped, are made of moldable polymeric material and have an inverted U-shaped cross section.

U.S. Pat. No. 4,858,559 (Allen) discloses a disposable pet toilet unit, having a body portion within which a deodorizing, absorbent, granular material is contained for use by household pets to defecate and urinate. The body portion is made of a moisture-proof material and includes a bottom and a plurality of sides extending upwardly from the bottom to form an opening. A moisture-proof film is secured to the body portion and gatherable about the opening thereof by a closure, such as a drawstring. Thus, when the deodorizing, absorbent, granular material becomes sufficiently soiled so as to no longer adequately deodorize and absorb odor and moisture, the drawstring may be pulled to gather the film together about the opening to substantially seal it. In this manner, the disposable pet toilet unit may be transported and discarded without spillage or leakage of the soiled, deodorizing, absorbent, granular material.

U.S. Pat. No. 4,034,760 (Amirsakis) discloses a self contained disposable diaper, including a combined disposable diaper and disposal bag, wherein a thin plastic sheet is affixed over the waterproof side of a conventional disposable diaper and sealed to it along a portion of its periphery to form a permanently attached waterproof pocket with part of the sheet that can be turned inside out to form a bag for the used disposable diaper and to form a flap with the remainder of the sheet, which can be closed over the bag opening to seal the bag.

U.S. Pat. No. 4,738,477 (Grossmeyer) discloses a disposable apparatus for the collection of refuse that includes a sheet like member for placement upon a surface. The member is devoid of apertures, defines a regular geometric shape, and in some embodiments includes a plurality of disposable securing stakes or adhesive pads attached at corners thereof for affixing the member to the surface during the collection of refuse. The corners are securable to one another by tying for disposal of the member, the securing stakes or adhesive pads, and the refuse collected thereon.

U.S. Pat. No. 3,227,137 (Goldman, et al.) discloses a lined animal commode comprising: a rectangularly shaped animal commode receptacle having side walls and open at the top; a disposable waterproof thermoplastic liner in the receptacle, the liner having a rectangularly shaped planar bottom and side walls, the bottom including double thickness folds of the liner forming isosceles triangle configurations with the bases thereof positioned along the lower portion of two parallel sides of the receptacle, the liner having side walls of a vertical dimension substantially greater than the side walls of the receptacle; and the side walls of the liner being folded over the side walls of the receptacle to substantially cover both sides thereof.

U.S. Pat. No. 4,938,607 (Kelley) descloses a sack-forming sheet, which has thermoplastic sheets having a draw tape within peripheral hems that are gatherable into sacks. Such sheets are useful for disposable kitchen liners, tablecloths, leaf-collecting bags, etc. Kelley does not show or describe an absorbent pad or any absorbent material.

In more detail, Kelley provides a rectangular, preferably square, thermoplastic sheet, which is adapted to be formed into a sack. A sheet has on its peripheral edges, surrounding a central section, a continuous hem with a draw tape enclosed therein. The term "hem", as used by Kelley, refers to a border of a sheet such as is formed by doubling back and securing the border to the sheet, thereby forming a substantially enclosed channel. The hem is generally tubular, and most often substantially collapsed tubular.

Kelley discloses a continuous draw tape, which preferably has a length less than the maximum peripheral length of the hems; that is, when the sheet is laid out flat, the draw tape will not extend beyond the perimeter of the sheet (column 2, lines 22-25).

U.S. Pat. No. 3,626,900 (Failla) discloses a disposable dog commode comprising a preferably square, flexible sheet of moistureproof material adapted to be spread upon a flat-supporting surface, such as a floor, pavement or the like, and be held in such position, while the dog uses the same, followed by the contraction of the edges and corners of the sheet to enclose the excrement for disposal in a suitable waste receptacle.

U.S. Pat. No. 4,800,677 (Mack) discloses an animal waste collection pad having a backing sheet of fluid impervious material and a non-woven top sheet thereon. An absorbent pad is disposed on the backing sheet and the pad contains a scent, attractive to dogs. The scent may be provided by a frangible capsule, a micro encapsulated scent incorporated in the pad or a spray applied to the pad. There are tapes or drawstrings attached to the backing sheet for tying the animal waste collection pad into a small compact package for disposal.

Mack further discloses that it is advantageous to have adhesive material with peelable strips covering the adhesive, so that the pad may be adhered to a floor on which it is positioned.

U.S. Pat. No. 4,869,204 (Yananton) discloses a claw resistant sorbent pad laminate for the collection of animal urine that includes a thin plastic bottom sheet outer layer of moisture impermeable material, such as polypropylene or polyethylene, an intermediate sorbent layer of material having a high sorbency capacity for urine, such as paper, tissue, pulp starch and related polymers, an optional protective layer made from a durable, non-woven tissue substance atop the intermediate sorbent layer, a top claw resistant disposable screen, and granular material placed on top thereof, to be used in combination with a litter box, having a centrally disposed base, upwardly extending walls, and top edges, many of which have lips The claw resistant sorbent pad laminate is secured to the litter box by means of securing means around the periphery of the bottom sheet layer. In one embodiment of the invention, the securing means is an elasticized area or areas around the periphery of the moisture impermeable material. In an alternate embodiment, a drawstring is movably affixed to the periphery of the bottom sheet layer.

For the foregoing reasons, there is a need for a pet waste collection apparatus that facilitates the hygienic collection and hygienic disposal of collected pet waste. A pet waste collection apparatus that is capable of collecting and facilitating disposal of collected feces and urine without a human handler contacting such collected wastes is needed.

The pet waste collection apparatus should be capable of attracting a young animal, dog, or other pet, to the pet waste collection for defecation and urination thereon, without the young animal, dog, or other pet substantially damaging the pet waste collection apparatus. A pet waste collection apparatus is necessary that comprises a substantially leak proof absorbent pad, which may be placed on a surface for receiving and collecting excrement and/or urine from the young animal, dog, or other pet, that can be easily formed into a bag by pulling a drawstring taut, when a sufficient amount of excrement and/or urine is collected.

The pet waste collection apparatus should be easy to use, handle, and dispose of in a hygienic and environmentally friendly manner, durable, damage resistant, leak proof, and inexpensive to manufacture.

SUMMARY

The present invention is directed to a pet waste collection apparatus, comprising: an absorbent pad,
  the absorbent pad comprising opposing outermost layers and a plurality of innermost layers of non-woven material sandwiched between the opposing outermost layers,
    the opposing outermost layers comprising a first outermost layer and a second outermost layer,
    the opposing outermost layers bordered by an outer peripheral border, the absorbent pad adapted to receive pet waste at the first outermost layer and prevent any the pet waste received at the first outermost layer from leaching through the absorbent pad to the second outermost layer;
the pet waste collection apparatus further comprising an interior passageway between the opposing outermost layers within the outer peripheral border;
the pet waste collection apparatus further comprising a drawstring exit connected to the interior passageway,
  the drawstring exit adjacent the outer peripheral border;
the pet waste collection apparatus further comprising a drawstring within the interior passageway,
  the drawstring having a drawstring exit portion exiting the pet waste collection apparatus through the drawstring exit;
the second outermost layer comprising a second outermost layer portion;
the second outermost layer comprising a lower periphery;
the drawstring exit portion of the drawstring adhesively and releasably fastened to the second outermost layer portion of the second outermost layer at the lower periphery,
  the pet waste collection apparatus adapted to form a shape of a bag when the drawstring exit portion of the drawstring is released from the second outermost layer and the drawstring is pulled taut,
    the pet waste collection apparatus substantially enclosing and substantially sealing the pet waste within the pet waste collection apparatus when the drawstring is pulled taut.

In a preferred embodiment of the present invention, the pet waste collection apparatus has a tab connected to the first outermost layer, which folds over to the second outermost layer and sandwiches the drawstring exit portion of the drawstring between the tab and the second outermost layer. The tab is adhesively and releasably fastened to the second outermost layer. The drawstring exit portion of the drawstring is adhesively and releasably fastened to the second outermost layer portion of the second outermost layer at the lower periphery thereof. The pet waste collection apparatus is adapted to form a shape of a bag when the drawstring exit portion of the drawstring is released from the second outermost layer and the drawstring is pulled taut, the pet waste collection apparatus substantially enclosing and substantially sealing the pet waste within the pet waste collection apparatus when the drawstring is pulled taut.

In another preferred embodiment of the present invention, the pet waste collection apparatus has an exit sleeve connected to the second outermost layer and the first outermost layer, which folds over to the second outermost layer and sandwiches the drawstring exit portion of the drawstring between the exit sleeve and the second outermost layer. The exit sleeve is adhesively and releasably fastened to the second outermost layer. The drawstring exit portion of the drawstring is adhesively and releasably fastened to the second outermost layer portion of the second outermost layer at the lower periphery thereof. The pet waste collection apparatus is adapted to form a shape of a bag when the drawstring exit portion of the drawstring is released from the second outermost layer and the drawstring is pulled taut, the pet waste collection apparatus substantially enclosing and substantially sealing the pet waste within the pet waste collection apparatus when the drawstring is pulled taut.

In another preferred embodiment of the present invention, the pet waste collection apparatus has an absorbent pad and an outer peripheral border connected to and adjacent one another and having opposing outermost layers, comprising a permeable outermost layer and a substantially leak proof outermost layer opposing one another, the absorbent pad having a first height and the outer peripheral border having a second height, which is less than the first height of the absorbent pad; the absorbent pad comprising at least one innermost layer of waste absorbing material sandwiched and completely enclosed between the opposing outermost layers and completely filling a volume between the opposing outermost layers extending to the outer peripheral border; the outer peripheral border having an interior passageway between the opposing outermost layers, a draw tape therein, and at least one outside substantially straight cut off corner having adjacent interior passageway openings; the draw tape having a length greater than that of the outer peripheral border; the draw tape routed through the adjacent interior passageway openings exposing the draw tape at the at least one outside substantially straight cut off corner; the waste collection apparatus forming a bag, having any collected waste therein, when the draw tape is pulled taut.

In another preferred embodiment of the present invention, the pet waste collection apparatus has a substantially square absorbent pad and an outer peripheral border connected to and adjacent one another and having opposing outermost layers, comprising a permeable outermost layer and a substantially leak proof outermost layer opposing one another, the substantially square absorbent pad having a first height and the outer peripheral border having a second height, which is less than the first height of the substantially square absorbent pad; the substantially square absorbent pad comprising at least one innermost layer of waste absorbing material sandwiched and completely enclosed between the opposing outermost layers and completely filling a volume between the opposing outermost layers extending to the outer peripheral border; the outer peripheral border having an interior passageway between the opposing outermost layers, a draw tape therein, and at least one outside diagonally cut off corner having substantially perpendicular interior passageway openings; the draw tape having a length greater than that of the outer peripheral border; the draw tape routed through the substantially perpendicular interior passageway openings exposing the draw tape at the at least one outside diagonally cut off corner; the waste collection apparatus forming a bag, having any collected waste therein, when the draw tape is pulled taut.

In yet another preferred embodiment of the present invention, the pet waste collection apparatus has a substantially square absorbent pad and an outer peripheral border connected to and adjacent one another and having opposing outermost layers, comprising a permeable outermost layer and a substantially leak proof outermost layer opposing one another, the substantially square absorbent pad having a first height and the outer peripheral border having a second height, which is less than the first height of the substantially square absorbent pad; the substantially square absorbent pad comprising at least one innermost layer of waste absorbing material sandwiched and completely enclosed between the opposing outermost layers and completely filling a volume between the opposing outermost layers extending to the outer peripheral border; the outer peripheral border having an interior passageway between the opposing outermost layers, a draw tape therein, and four opposing outside diagonally cut off corners, each opposing outside diagonally cut off corner of the four opposing outside diagonally cut off corners having substantially perpendicular interior passageway openings; the draw tape having a length greater than that of the outer peripheral border; the draw tape routed through the substantially perpendicular interior passageway openings exposing the draw tape at the each opposing outside diagonally cut off corner; the waste collection apparatus forming a bag, having any collected waste therein, when the draw tape is pulled taut.

In yet other embodiments of the present invention, the pet waste collection apparatus has a leak protection barrier adjacent the absorbent pad and adjacent the interior passageway between the opposing outermost layers adjacent the outer peripheral border.

Each of the aforementioned embodiments of the pet waste collection apparatus of the present invention facilitates collection and disposal of the collected pet waste in a hygienic and environmentally friendly manner.

The pet waste collection apparatus of the present invention facilitates the hygienic collection and hygienic disposal of collected pet waste, and is capable of collecting and facilitating disposal of collected feces and urine without a human handler contacting such collected wastes.

The pet waste collection apparatus is capable of attracting a young animal, dog, or other pet, to the pet waste collection for defecation and urination thereon, without the young animal, dog, or other pet substantially damaging the pet waste collection apparatus. The pet waste collection apparatus of the present invention comprises a substantially leak proof absorbent pad, which may be placed on a surface for receiving and collecting excrement and/or urine from a young animal, dog, or other pet, and can be easily formed into a bag by pulling a drawstring taut, when a sufficient amount of excrement and/or urine is collected.

The pet waste collection apparatus of the present invention is easy to use, handle, and dispose of in a hygienic and environmentally friendly manner, is durable, damage resistant, leak proof, and inexpensive to manufacture.

DRAWINGS

These and other features, aspects, and advantages of the present invention will become better understood with regard to the following description, appended claims, and accompanying drawings where:

FIG. 8 is a cross section view of the pet waste collection apparatus of FIG. 1 showing an outer peripheral border of the pet waste collection apparatus having an interior passageway and the drawstring therein adjacent an absorbent pad of the pet waste collection apparatus;

FIG. 9 is a cross section view of the bifurcated exit sleeve of the pet waste collection apparatus of FIG. 1, showing the drawstring exit portion of the drawstring therein;

FIG. 14 is a cross section view of the alternate embodiment of the exit sleeve of FIG. 13;

FIG. 21 is a cross section view of the pet waste collection apparatus of FIG. 19 showing an outer peripheral border of the pet waste collection apparatus having an interior passageway and a drawstring therein adjacent a leak protection barrier, which is adjacent an absorbent pad of the pet waste collection apparatus;

FIG. 22 is a top view of the other alternate embodiment of the pet waste collection apparatus of FIG. 19 showing a tab of the pet waste collection apparatus adhesively and releasably fastened to a bottom corner portion of the pet waste collection apparatus;

FIG. 23 is a top view of the other alternate embodiment of the pet waste collection apparatus of FIG. 19 showing the tab of the pet waste collection apparatus released from the bottom corner portion of the pet waste collection apparatus;

FIG. 24 is a bottom view of the alternate embodiment of the pet waste collection apparatus of FIG. 19 showing the tab of the pet waste collection apparatus released from the bottom corner portion of the pet waste collection apparatus;

Figure 25:
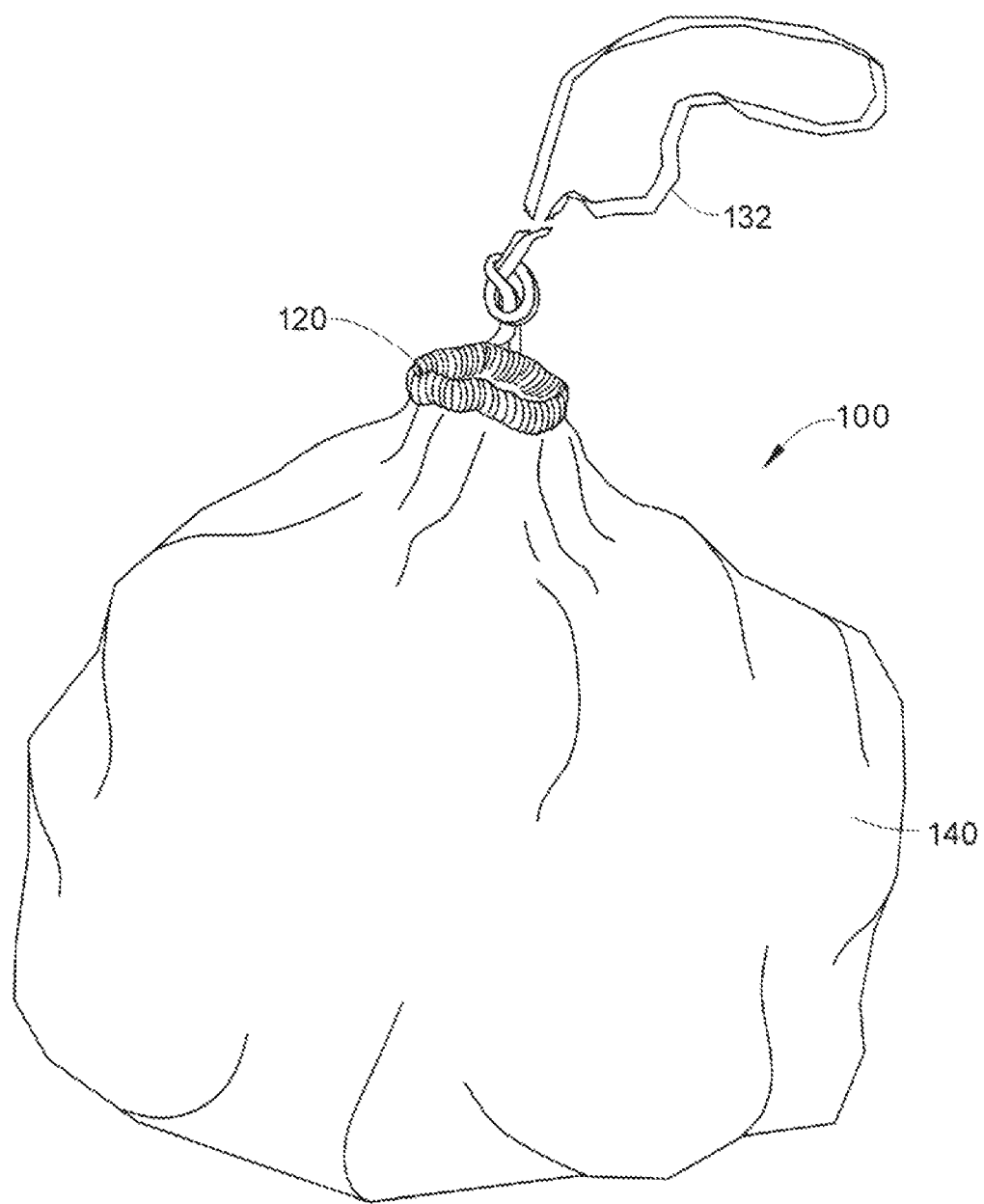
FIG. 25 is a perspective view of an alternate embodiment of the pet waste collection apparatus of FIG. 1, constructed in accordance with the present invention, showing the pet waste collection apparatus closed and forming a bag having any collected waste therein when a draw tape of the pet waste collection apparatus is pulled taut.
Figure 26:
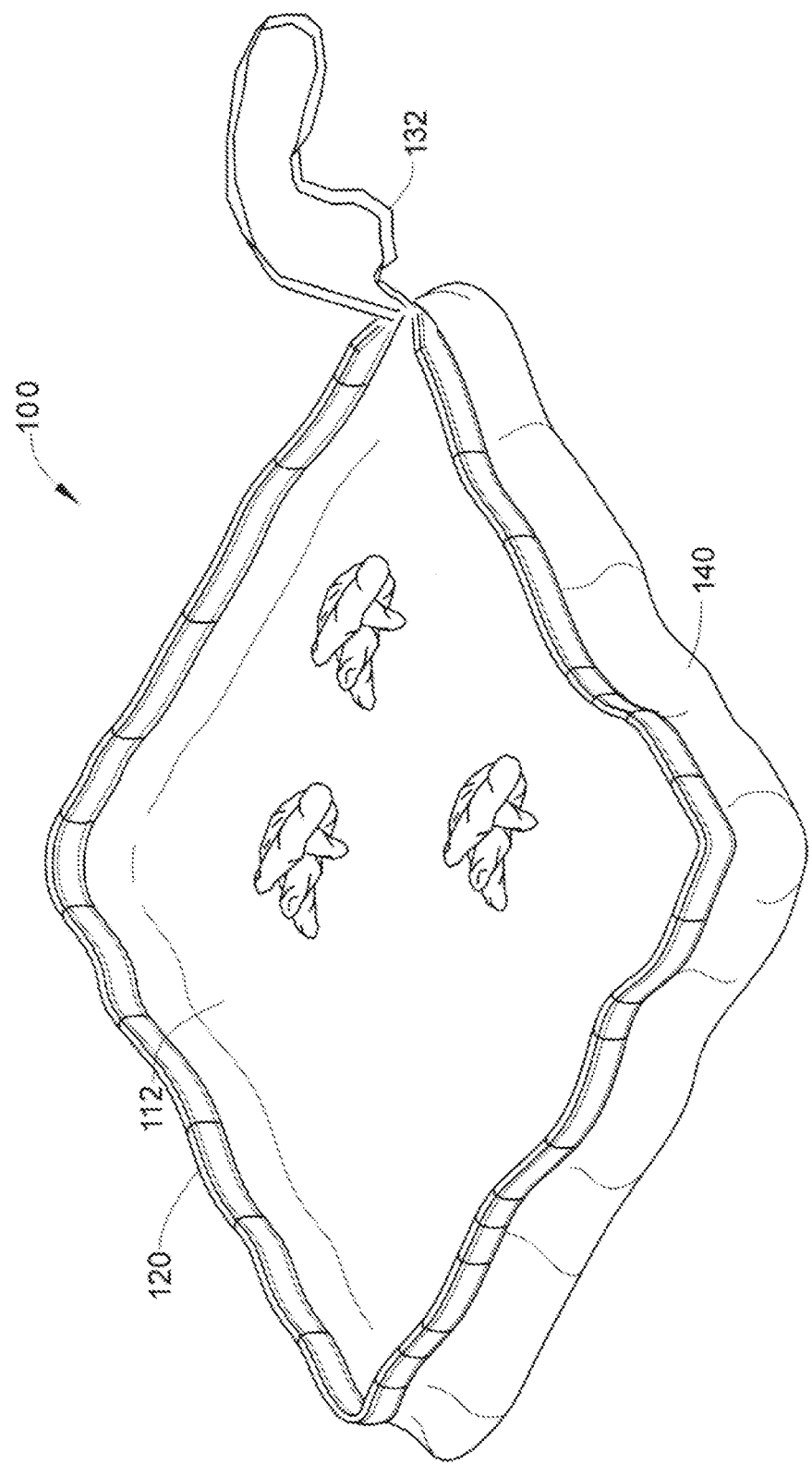
FIG. 26 is a perspective view of the pet waste collection apparatus of FIG. 25 showing the pet waste collection apparatus partially closed.
Figure 27:
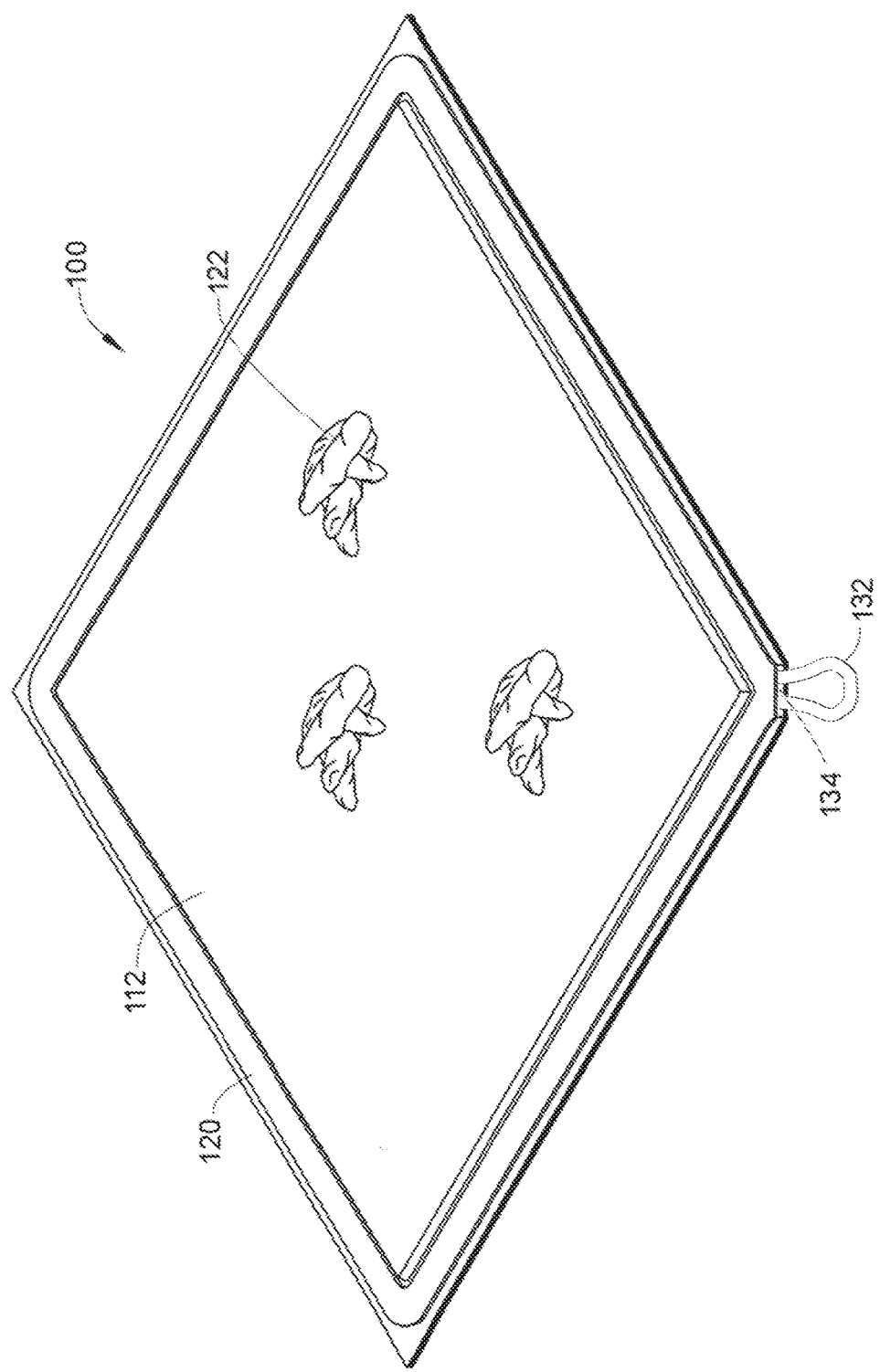
FIG. 27 is a top perspective view of the pet waste collection apparatus of FIG. 25 showing the pet waste collection apparatus open.
Figure 28:
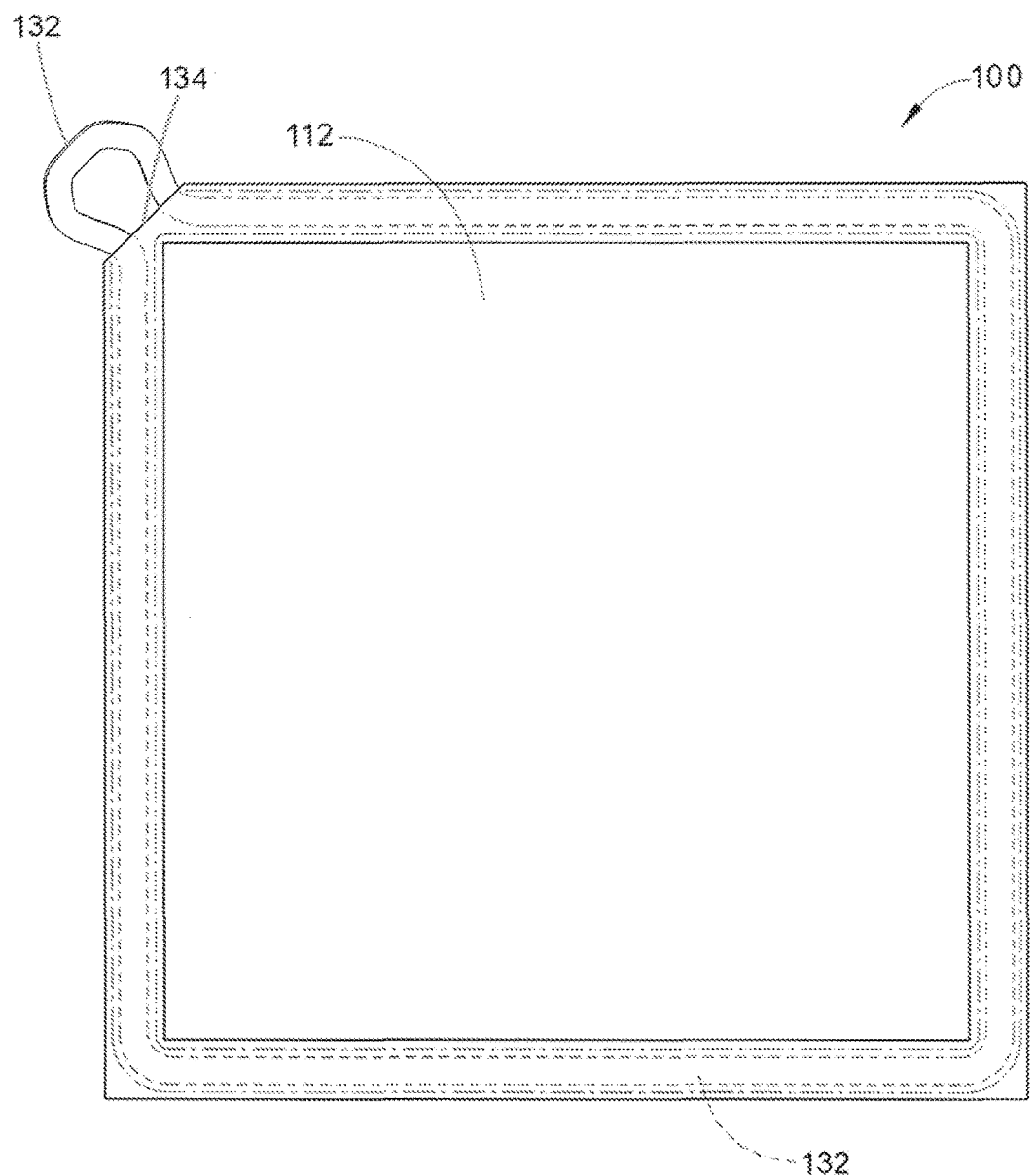
FIG. 28 is a top view of the pet waste collection apparatus of FIG. 25 showing the pet waste collection apparatus open.
Figure 29:
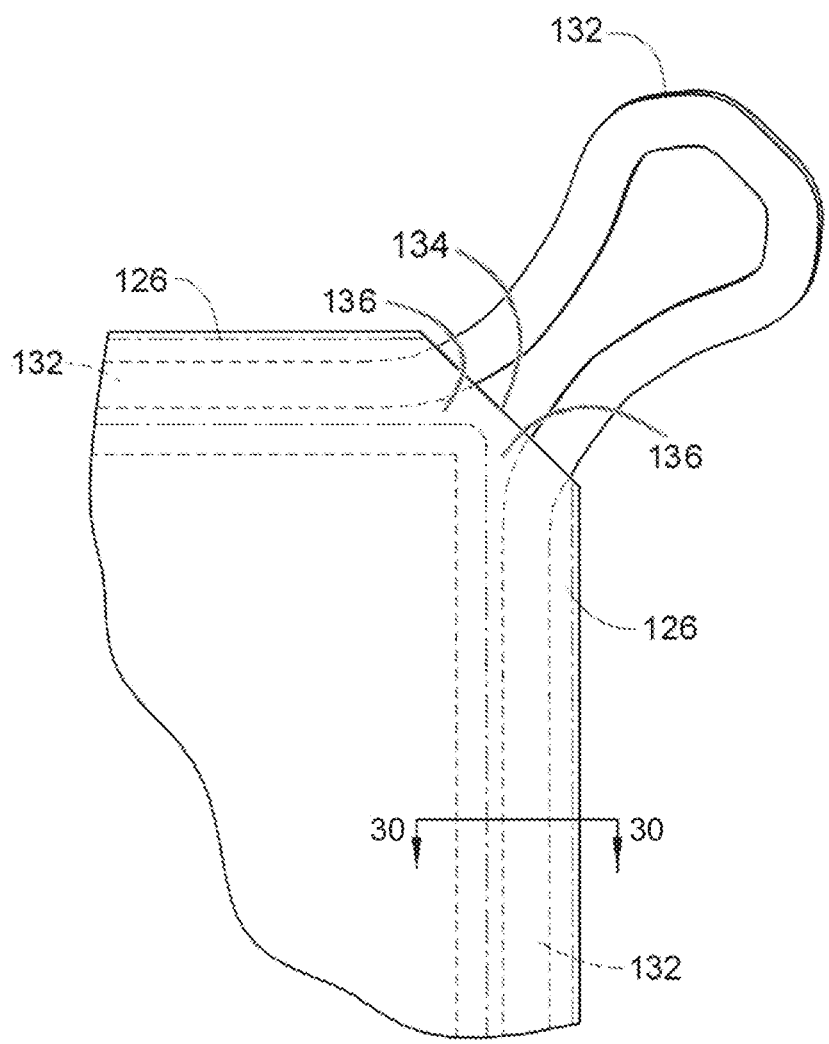
FIG. 29 is a bottom enlarged perspective view of a bottom corner portion of the pet waste collection apparatus of FIG. 25.
Figure 30:
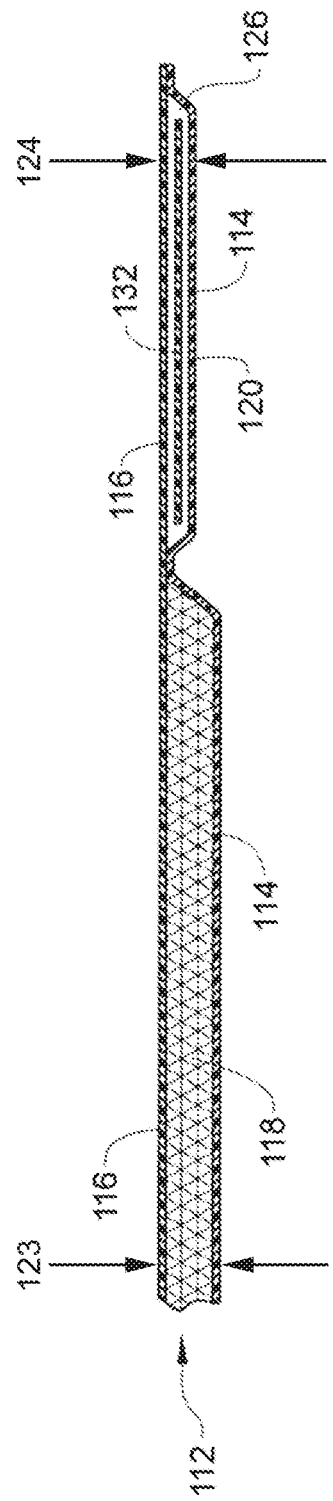
Figure 31:
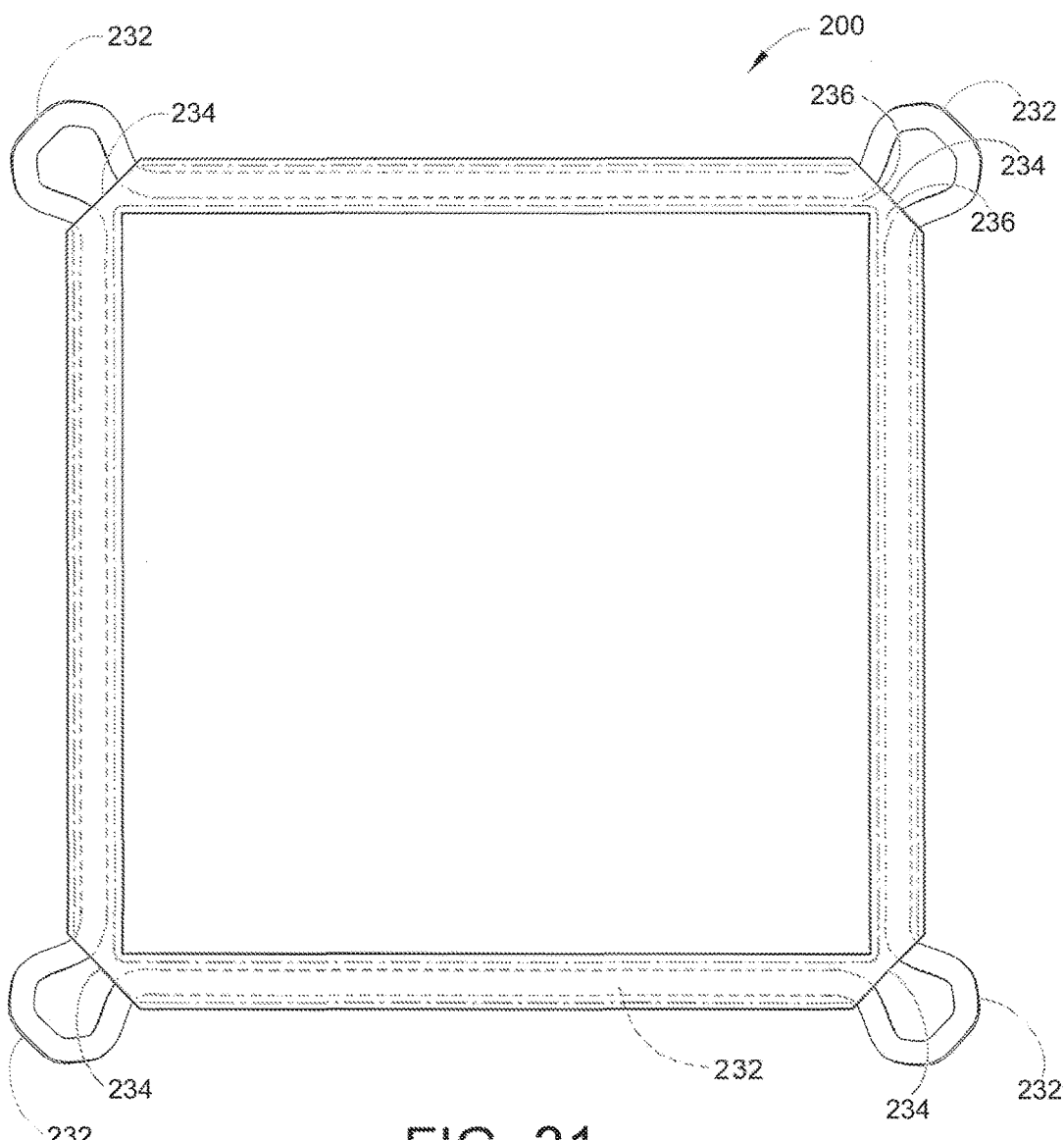

FIG. 30 is a cross section view of the pet waste collection apparatus of FIG. 25 showing an outer peripheral border of the pet waste collection apparatus having an interior passageway and the draw tape therein adjacent an absorbent pad of the pet waste collection apparatus; and FIG. 31 is a top view of an alternate embodiment of the pet waste collection apparatus of FIG. 25, constructed in accordance with the present invention, showing the pet waste collection apparatus open.

DESCRIPTION

The preferred embodiments of the present invention will be described with reference to FIGS. 1-31 of the drawings. Identical elements in the various figures are identified with the same reference numbers.

FIGS. 1-31 show embodiments of the present invention, a waste collection apparatus, which may be used to receive, enclose, and seal one or more types of waste therein. Upon placement of the waste collection apparatus on a surface, such as, for example, a substantially flat surface or other suitable surface, and upon receipt of any waste by the waste collection apparatus, the waste collection apparatus may be used to substantially enclose and substantially seal the received waste by pulling a drawstring or draw tape of the waste collection apparatus taut. The waste collection apparatus may be used to receive, substantially enclose and substantially seal a variety of different kinds of received wastes.

In certain embodiments, the pet waste collection apparatus of the present invention has a drawstring within an outer peripheral border of the pet waste collection apparatus, the drawstring having a drawstring exit portion exiting the pet waste collection apparatus, the drawstring exit portion of the drawstring releasably fastened to a bottom corner portion of the pet waste collection apparatus, the pet waste collection apparatus adapted to form a shape of a bag when the drawstring exit portion of the drawstring is released from the bottom corner portion of the pet waste collection apparatus and the drawstring is pulled taut, the pet waste collection apparatus substantially enclosing and sealing pet waste within the pet waste collection apparatus when the drawstring is pulled taut. Alternative embodiments include a bifurcated exit sleeve, an alternate exit sleeve, and a tab, each adapted to adhesively and releasably fasten the drawstring exit portion to the bottom corner of the pet waste collection apparatus, and a pet waste collection apparatus having a leak protection barrier adjacent the outer peripheral border of the pet waste collection apparatus.

In alternative embodiments, the pet waste collection apparatus of the present invention has an absorbent pad having a first height and an outer peripheral border having a second height less than the first height, each having opposing outermost layers, comprising a permeable outermost layer and an opposing substantially leak proof outermost layer; the absorbent pad comprising at least one innermost layer of waste absorbing material sandwiched and completely enclosed between the opposing outermost layers and completely filling a volume between the opposing outermost layers extending to the outer peripheral border; the outer peripheral border having an interior passageway, a draw tape therein, and at least one outside diagonally cut off corner having a draw tape exit; the draw tape having a length greater than that of the outer peripheral border and extending out of the draw tape exit; the waste collection apparatus forming a bag, having any collected waste therein, when the draw tape is pulled taut.

FIGS. 1-12 show an embodiment of the present invention, a pet waste collection apparatus 10 comprising an absorbent pad 12, the absorbent pad 12 comprising a first outermost layer 14 and a second outermost layer 16 opposing one another and a plurality of innermost layers 18 of non-woven material or other suitable material sandwiched between the first outermost layer 14 and the second outermost layer 16. The pet waste collection apparatus 10 has an outer peripheral border 20 about and adjacent the absorbent pad 12. The first outermost layer 14 and the second outermost layer 16 of the absorbent pad 12 also form top and bottom surfaces of the outer peripheral border 20.

The absorbent pad 12 is adapted to receive pet waste 22 at the first outermost layer 14 and prevent any of the pet waste 22 received at the first outermost layer 14 from leaching through the absorbent pad 12 to the second outermost layer 16.

The outer peripheral border 20 has an interior passageway 26 between the first outermost layer 14 and the second outermost layer 16 within the outer peripheral border 20. The pet waste collection apparatus 10 has an exit sleeve 28 connected to the interior passageway 26. The outer peripheral border 20 has an exit sleeve exit portion 30. The exit sleeve 28 exits the pet waste collection apparatus 10 at the exit sleeve exit portion 30 of the outer peripheral border 20. The exit sleeve 28 also has exit sleeve passageways 31.

The pet waste collection apparatus 10 has a drawstring 32 within the interior passageway 26. The drawstring 32 has a drawstring exit portion 34 exiting the pet waste collection apparatus 10 through the exit sleeve passageways 31 of the exit sleeve 28.

The second outermost layer 16 has a second outermost layer portion 36. The exit sleeve 28 is adhesively and releasably fastened to the second outermost layer portion 36 of the second outermost layer 16, the second outermost layer 16 having a lower periphery 38. The exit sleeve 28 releasably sandwiches the drawstring exit portion 34 of the drawstring 32 between the exit sleeve 28 and the second outermost layer portion 36 of the second outermost layer 16 at the lower periphery 38 of the second outermost layer 16.

The pet waste collection apparatus 10 is adapted to form a shape of a bag 40 when the exit sleeve 28 is released from the second outermost layer 16 and the drawstring 32 is pulled taut. When the drawstring 32 is pulled taut, the pet waste collection apparatus 10 substantially encloses and substantially seals the pet waste 22 that has been received by the pet waste collection apparatus 10.

The first outermost layer 14 is preferably heat sealed to the second outermost layer 16 at the lower periphery 38 of the second outermost layer 16 at first junction 41.

The first outermost layer 14 is preferably heat sealed to the second outermost layer 16 at second junction 42, which is adjacent both the absorbent pad 12 and the outer peripheral border 20 of the pet waste collection apparatus 10.

The first outermost layer 14 has a first outermost layer portion 44. The exit sleeve 28 comprises the first outermost layer portion 44 and the second outermost layer portion 36, which are heat sealed together at periphery 47 of the exit sleeve 28.

The first outermost layer portion 44 and the second outermost layer portion 36 are preferably heat sealed together at substantially centrally disposed junction 46. The centrally disposed junction 46 prevents the drawstring 32, which forms a continuous loop, from accidently being drawn into the pet waste collection apparatus 10.

Figure 1:
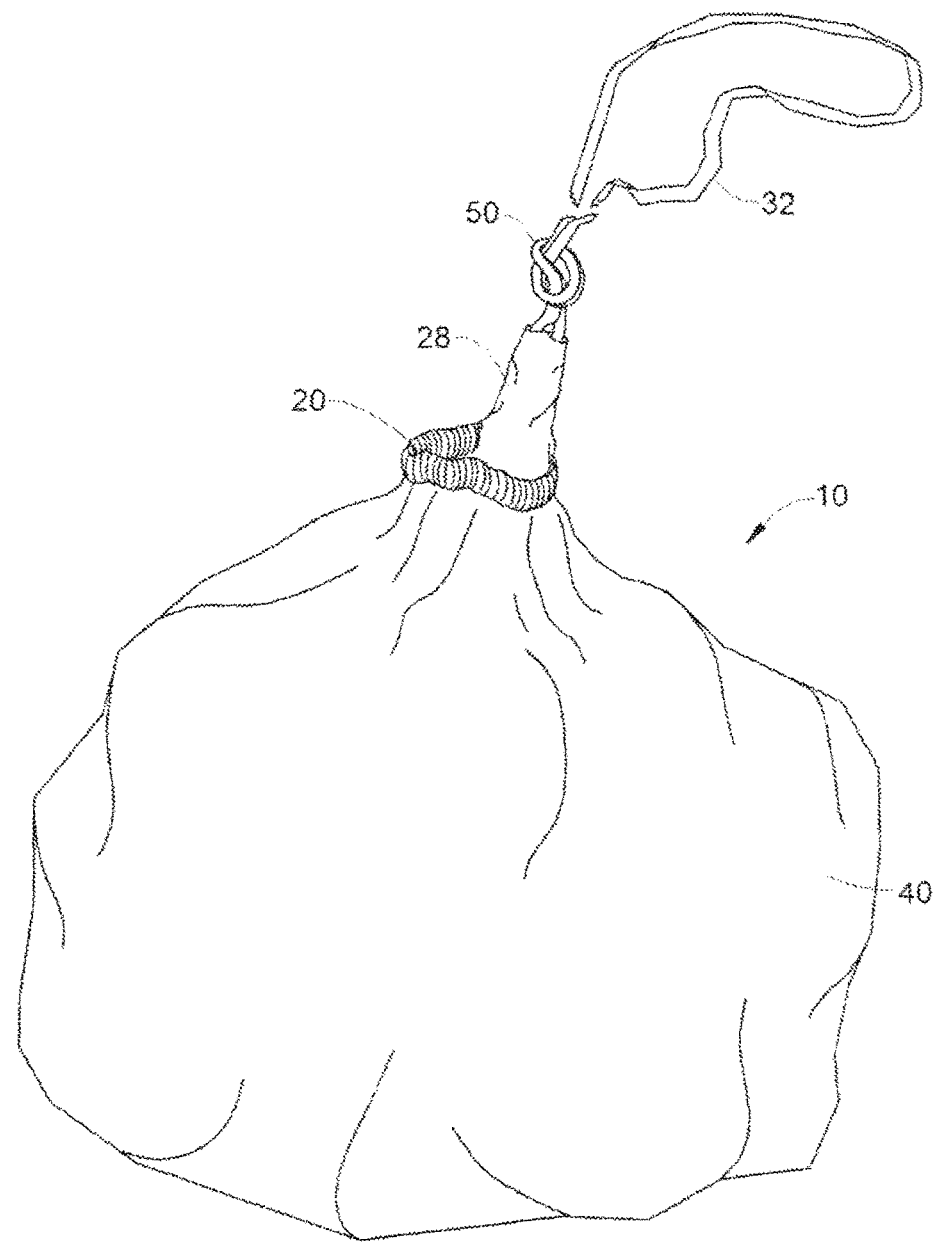
FIG. 1 is a perspective view of a pet waste collection apparatus, constructed in accordance with the present invention, showing the pet waste collection apparatus closed.
Figure 2:
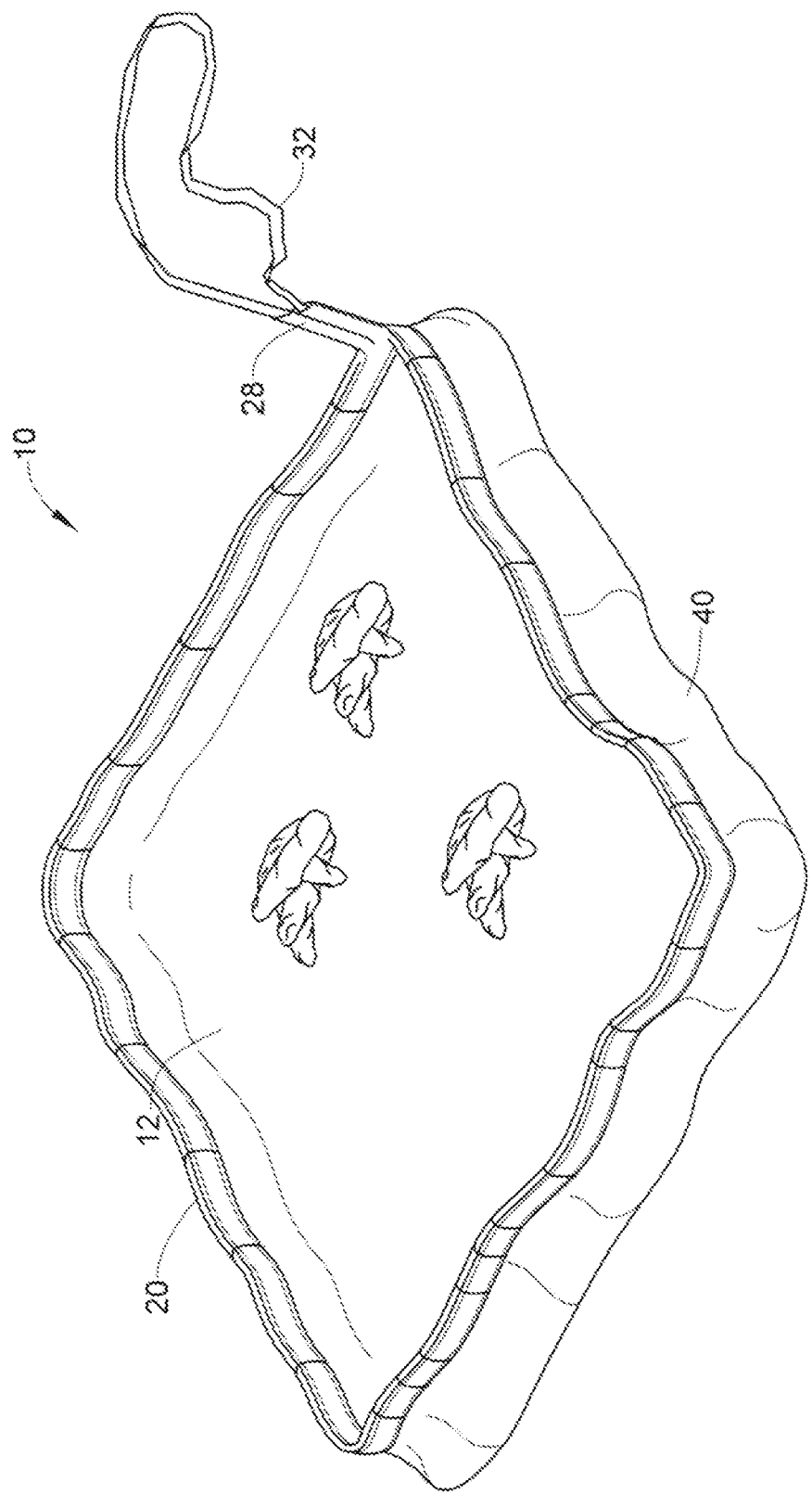
FIG. 2 is a perspective view of the pet waste collection apparatus of FIG. 1 showing the pet waste collection apparatus partially closed.
Figure 3:
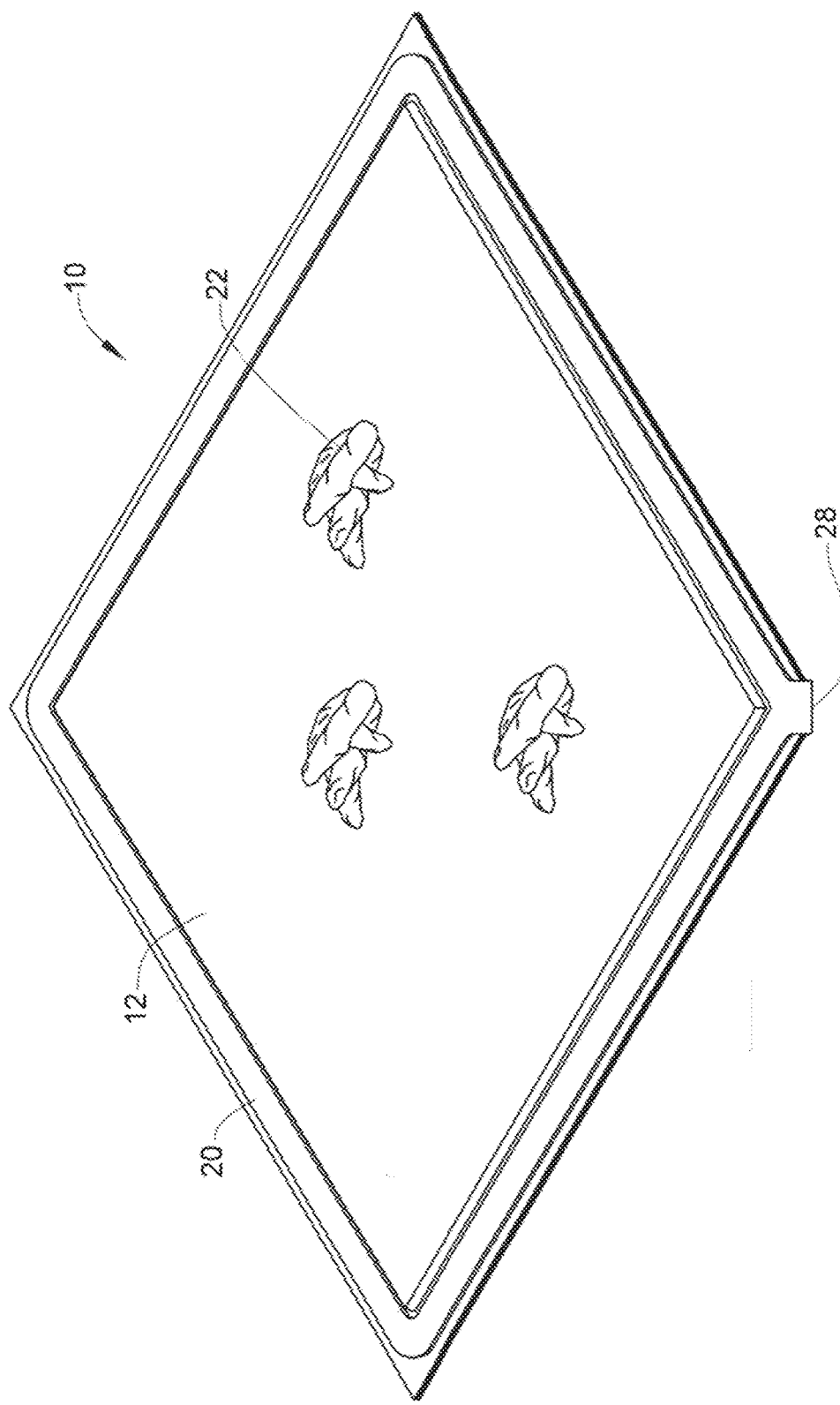
FIG. 3 is a top perspective view of the pet waste collection apparatus of FIG. 1 showing the pet waste collection apparatus open.
Figure 4:
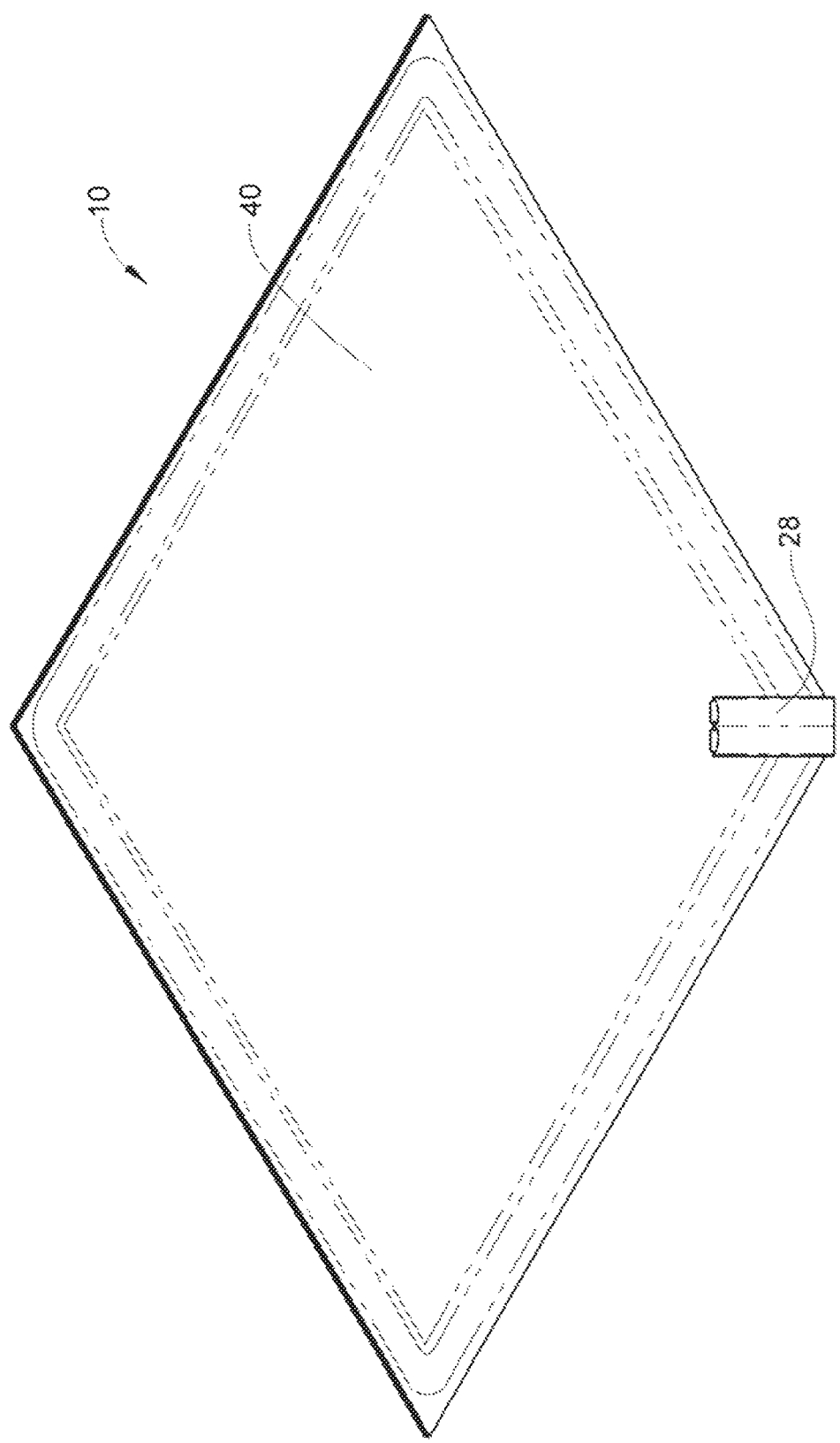
FIG. 4 is a bottom perspective view of the pet waste collection apparatus of FIG. 1 showing the pet waste collection apparatus open.
Figure 5:
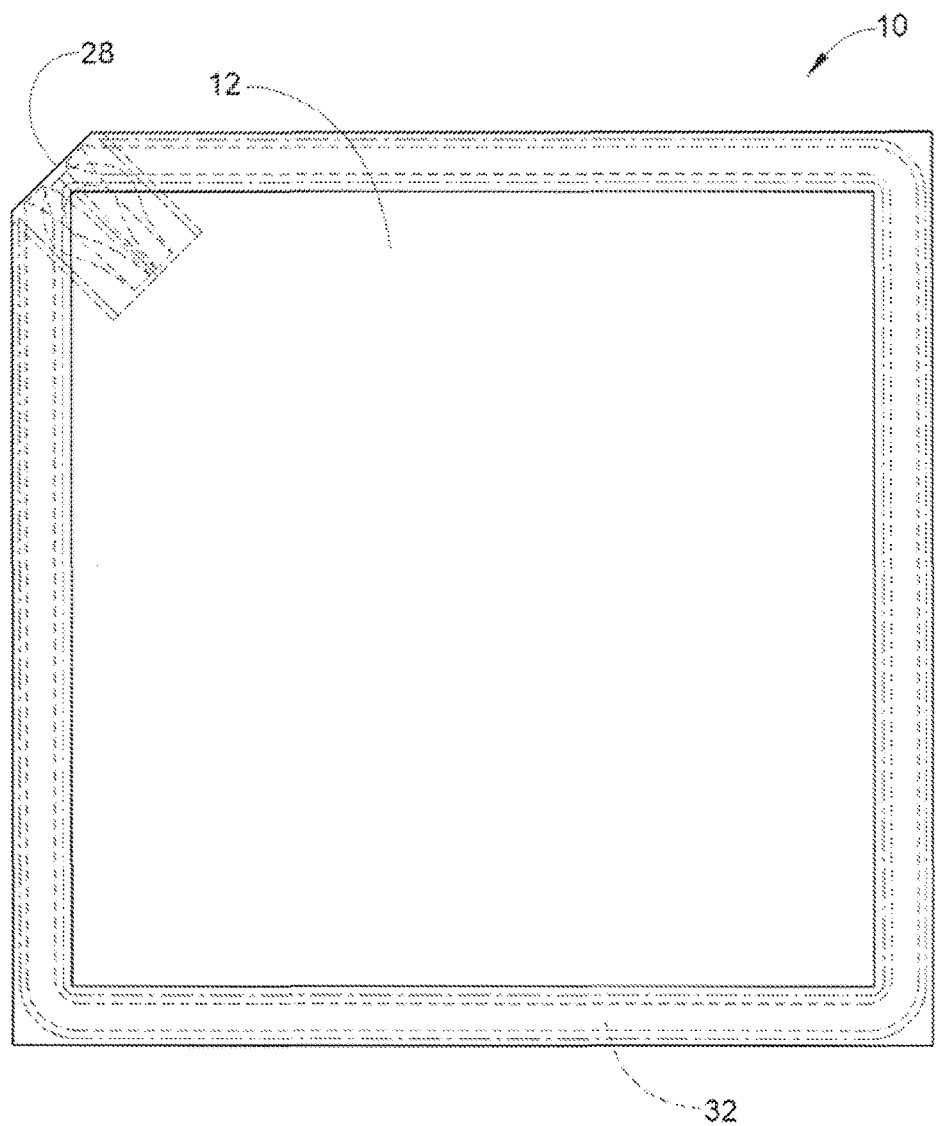
FIG. 5 is a top view of the pet waste collection apparatus of FIG. 1 showing the pet waste collection apparatus open.
Figure 6:
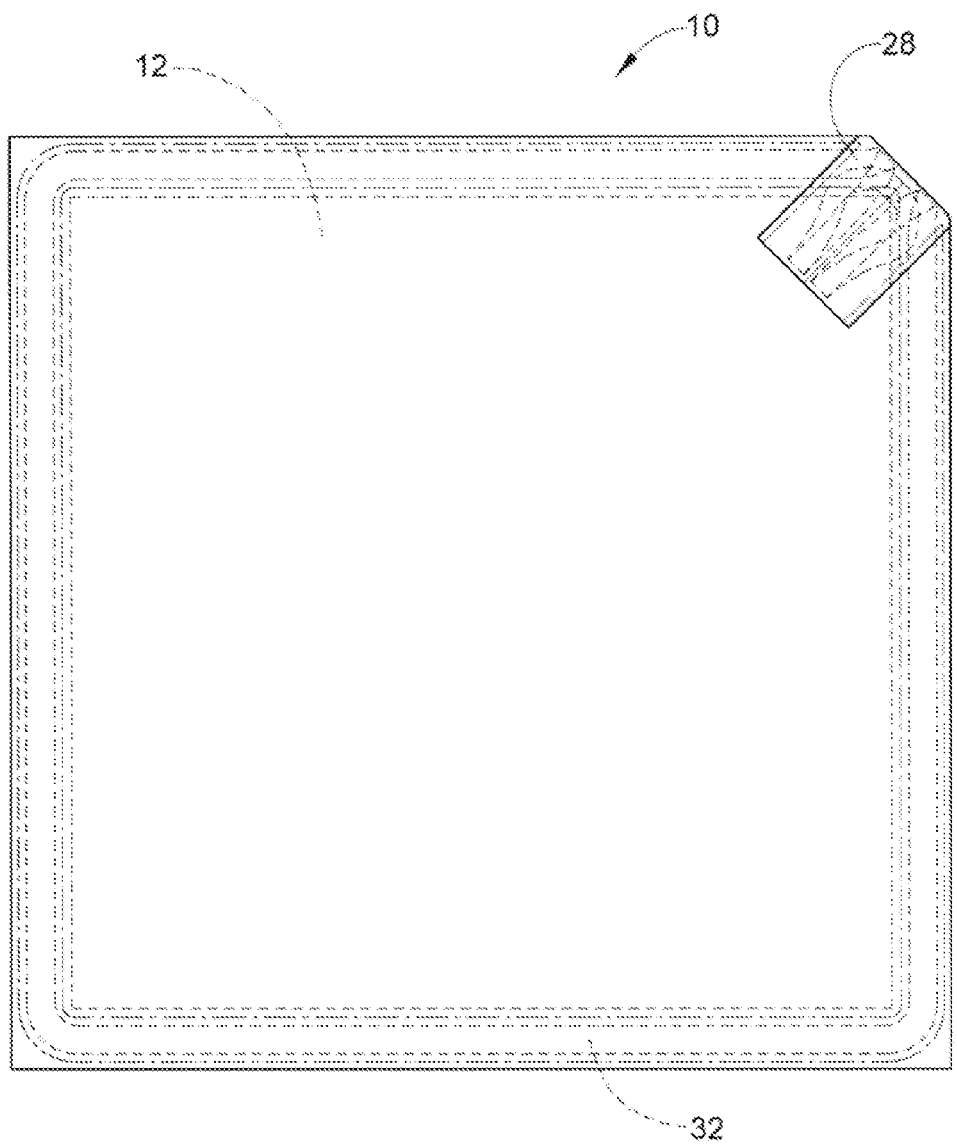
FIG. 6 is a bottom view of the pet waste collection apparatus of FIG. 1 showing the pet waste collection apparatus open.
Figure 7:
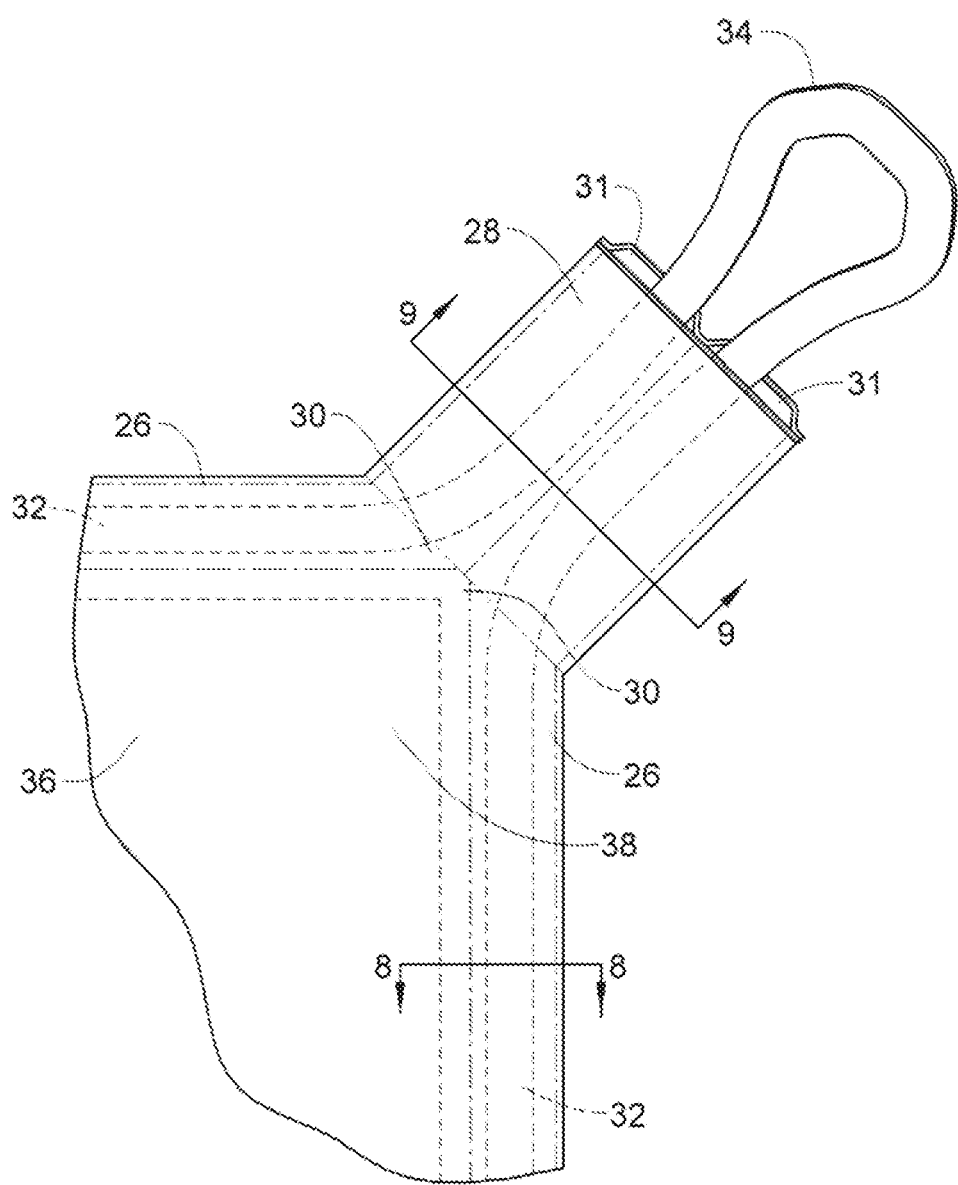
FIG. 7 is a bottom enlarged perspective view of a bottom corner portion of the pet waste collection apparatus of FIG. 1 showing a bifurcated exit sleeve and a drawstring exit portion of a drawstring released and lifted away from the exit sleeve.
Figure 10:
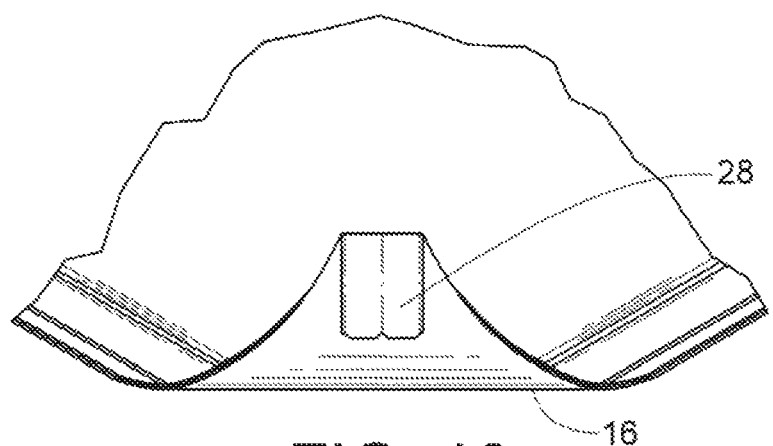
FIG. 10 is an end perspective view of the pet waste collection apparatus of FIG. 1 showing the bifurcated exit sleeve of the pet waste collection apparatus adhesively and releasably fastened to a bottom corner portion of the pet waste collection apparatus with the bottom corner portion partially lifted up.
Figure 11:
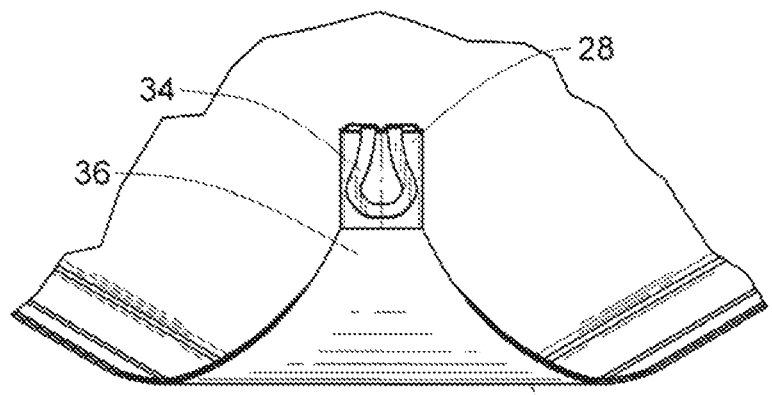
FIG. 11 is an end perspective view of the pet waste collection apparatus of FIG. 1 showing the bifurcated exit sleeve of the pet waste collection apparatus released from the bottom corner portion of the pet waste collection apparatus with the bottom corner portion partially lifted up.
Figure 12:
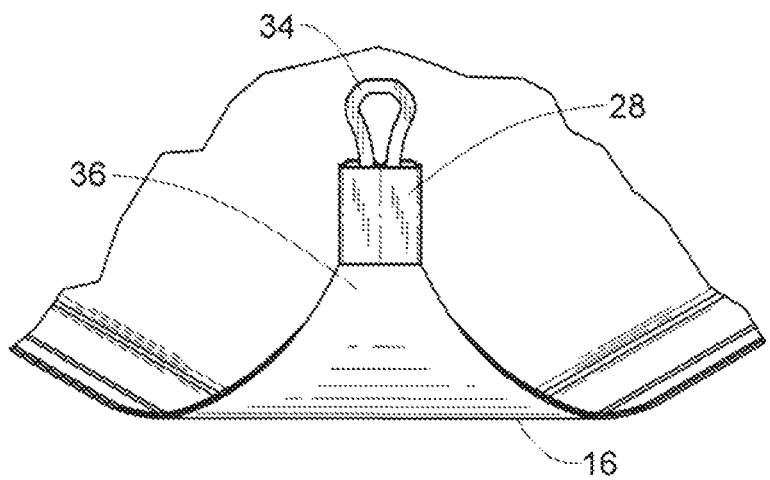
FIG. 12 is an end perspective view of the pet waste collection apparatus of FIG. 1 showing the bifurcated exit sleeve of the pet waste collection apparatus released from the bottom corner portion of the pet waste collection apparatus showing the drawstring exit portion of the drawstring released and lifted away from the bifurcated exit sleeve with the bottom corner portion partially lifted up.
Figure 13:
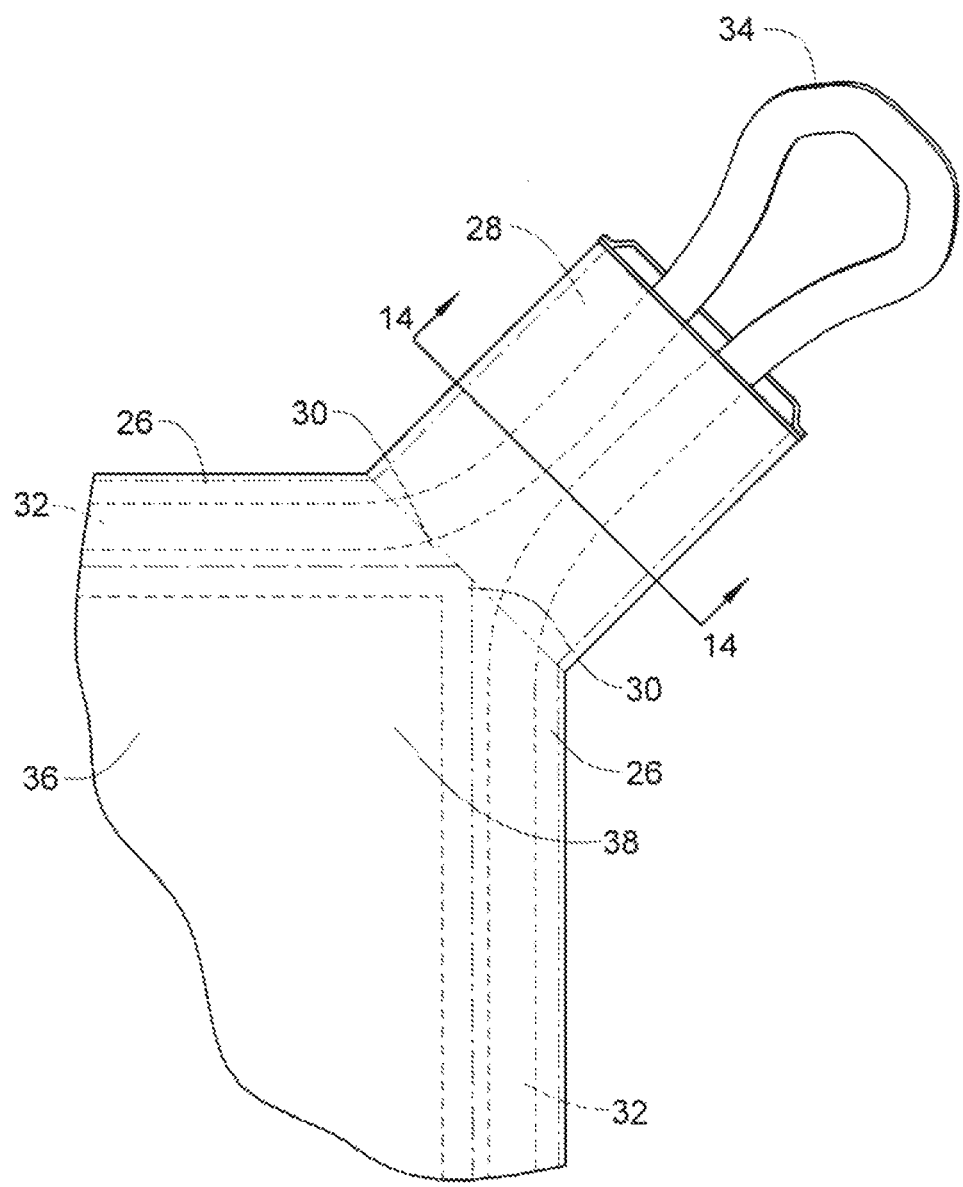
FIG. 13 is a bottom enlarged perspective view of a bottom corner portion of the pet waste collection apparatus showing an alternate embodiment of an exit sleeve and the drawstring exit portion of the drawstring released and lifted away from the exit sleeve.
Figure 15:
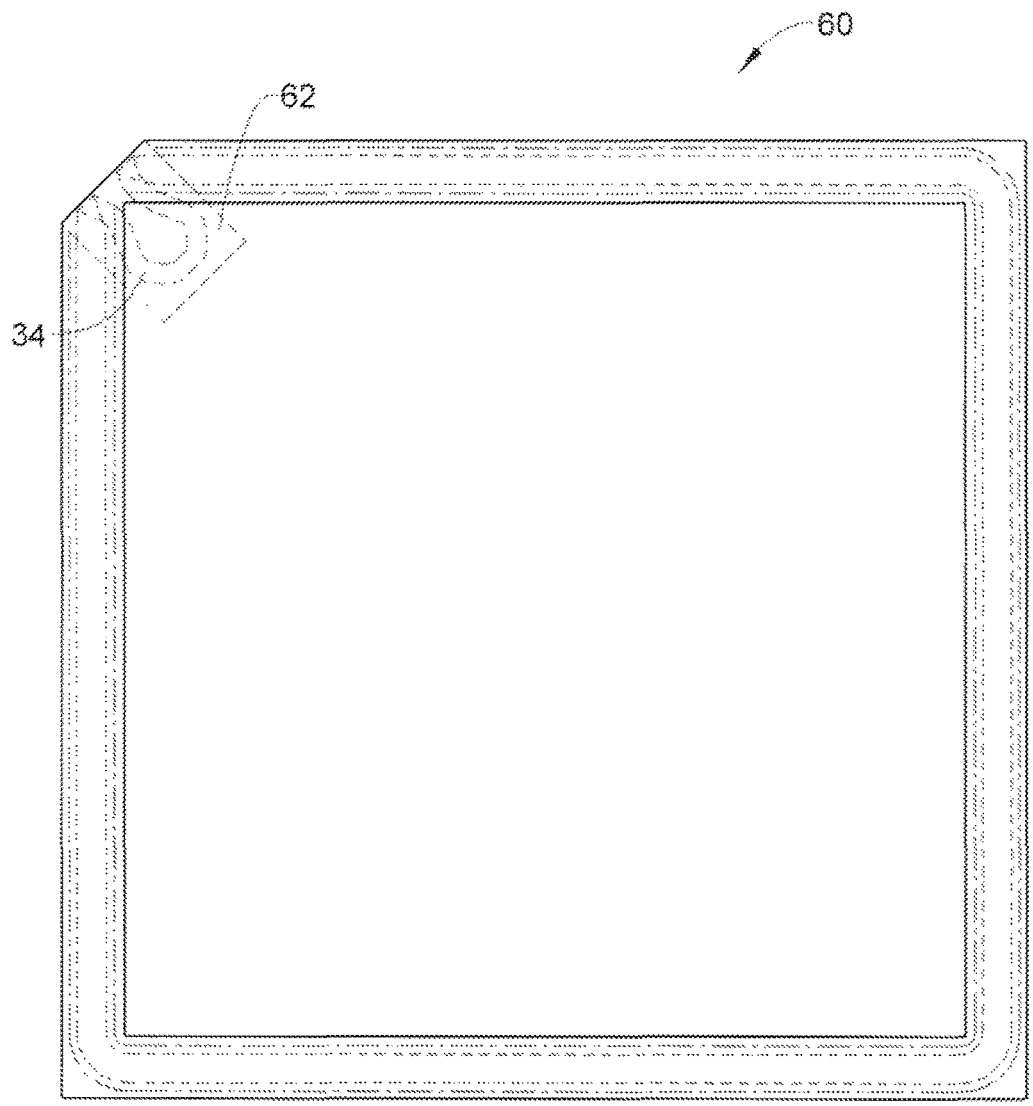
FIG. 15 is a top view of an alternate embodiment of a pet waste collection apparatus, constructed in accordance with the present invention, showing the pet waste collection apparatus open.
Figure 18:
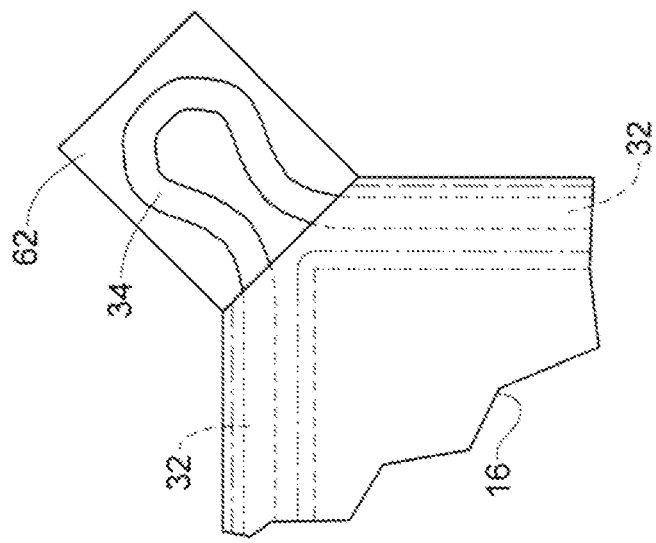
FIG. 18 is a bottom view of the alternate embodiment of the pet waste collection apparatus of FIG. 15 showing the tab of the pet waste collection apparatus released from the bottom corner portion of the pet waste collection apparatus.
Figure 17:
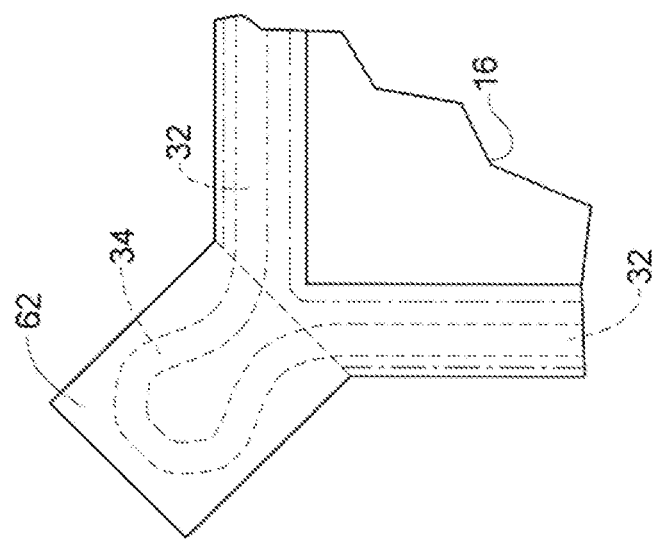
FIG. 17 is a top view of the alternate embodiment of the pet waste collection apparatus of FIG. 15 showing the tab of the pet waste collection apparatus released from the bottom corner portion of the pet waste collection apparatus.
Figure 16:
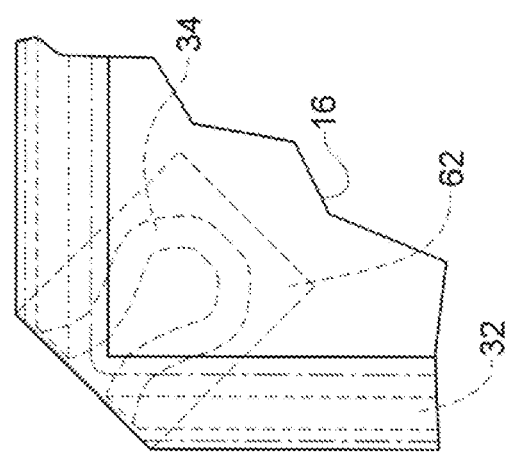
FIG. 16 is a top view of the alternate embodiment of the pet waste collection apparatus of FIG. 15 showing a tab of the pet waste collection apparatus adhesively and releasably fastened to a bottom corner portion of the pet waste collection apparatus.
Figure 19:
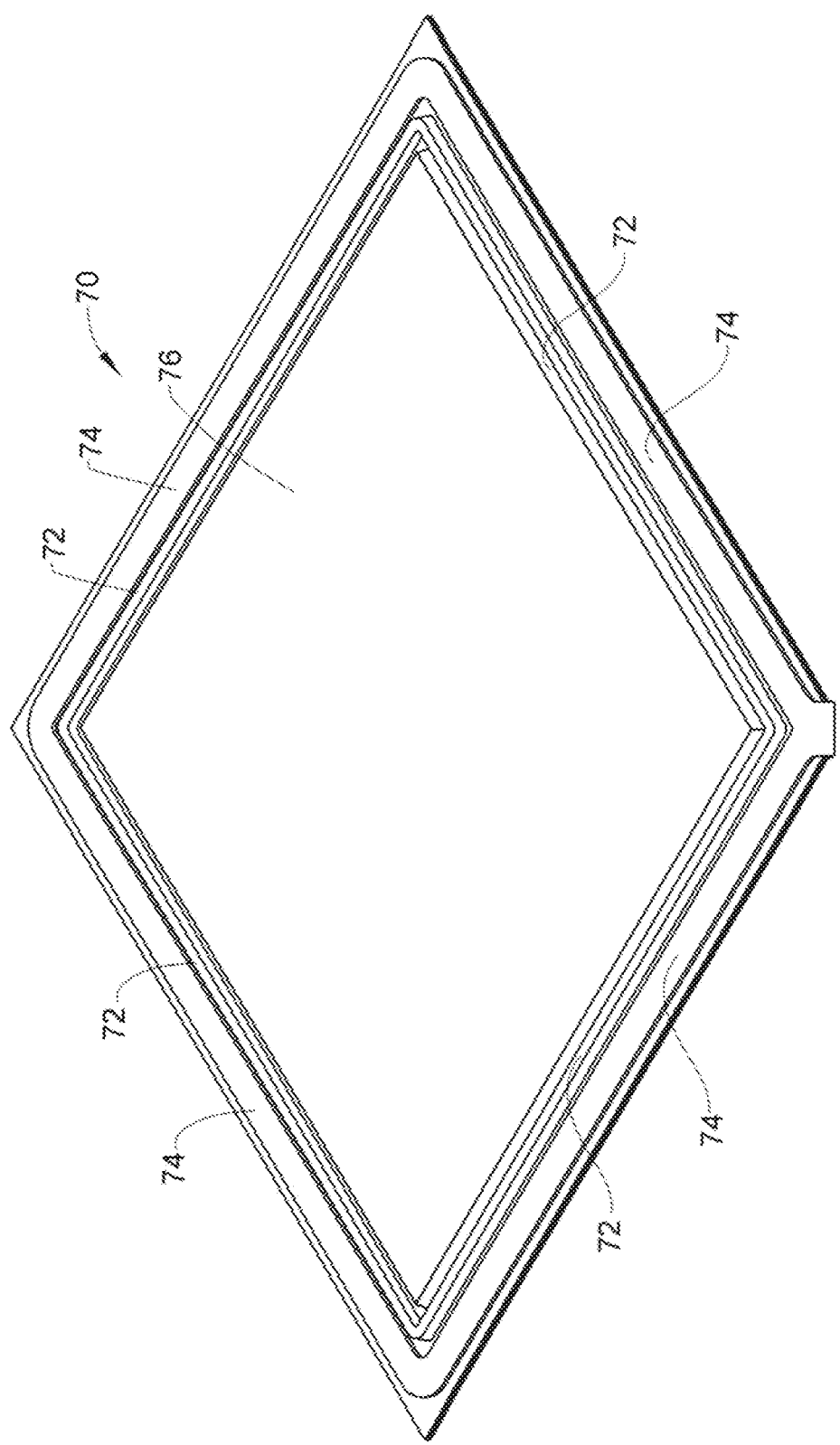
FIG. 19 is a top perspective view of another alternate embodiment of a pet waste collection apparatus, constructed in accordance with the present invention, showing the pet waste collection apparatus open.
Figure 20:
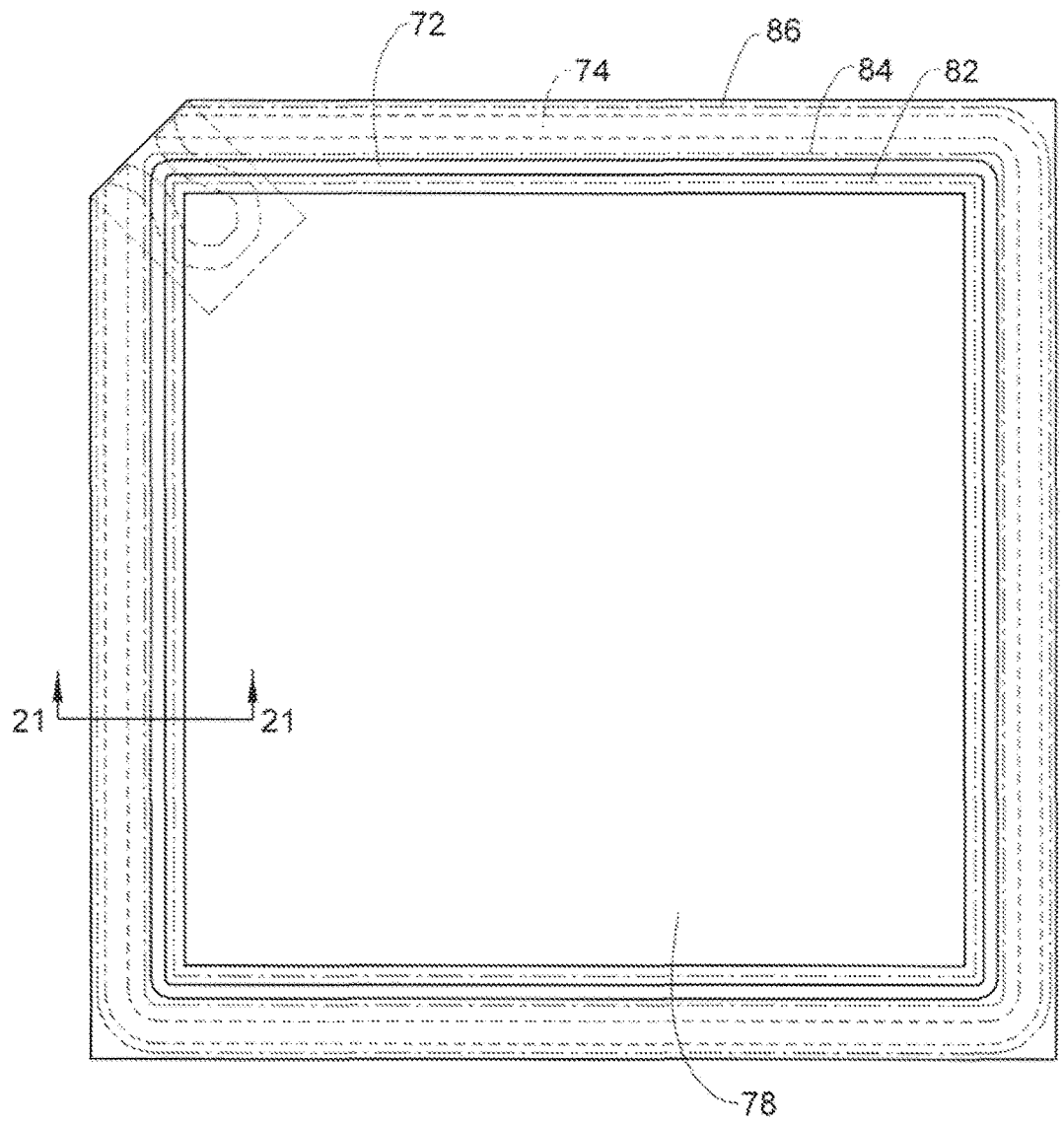
FIG. 20 is a top view of the other alternate embodiment of the pet waste collection apparatus of FIG. 19, constructed in accordance with the present invention, showing the pet waste collection apparatus open.

An alternate embodiment of an exit sleeve 48 may comprise a single interior passageway 49, as shown in FIGS. 13 and 14.

The drawstring 32 may optionally be tied into a knot 50, which facilitates carrying and disposing the pet waste collection apparatus 10. The drawstring 32 may alternatively have separate ends, which may be used to tie the drawstring 32.

The pet waste collection apparatus 10 may alternatively have a fastener or other suitable fastening means that may be used to adhesively and releasably fasten the drawstring 32 to the second outermost layer portion 36 of the second outermost layer 16 at the lower periphery 38 of the second outermost layer 16.

The first outermost layer 14 is preferably of permeable or semi permeable material or other suitable material, and the second outermost layer 16 is preferably of substantially leak proof low density polypropylene or other suitable material, each of which are preferably suitable for heat sealing one to the other.

The plurality of innermost layers 18 of non-woven material or other suitable material sandwiched between the first outermost layer 14 and the second outermost layer 16 may alternatively comprise one or more layers of non-woven material or other suitable material that facilitates absorption of wastes.

The first outermost layer 14, the second outermost layer 16, and the innermost layers 18 of the pet waste collection apparatus 10 are each preferably of flexible sheet material that facilitates the pet waste collection apparatus 10 to be stored folded or rolled up, prior to use.

The pet waste collection apparatus 10 may be supplied individually. The pet waste collection apparatus 10 may alternatively be supplied in folded sheets or in rolls, each having one or more of the pet waste collection apparatus 10 adjacent one another with easy to separate perforations, or in another suitable manner.

A logo or indicia may also be placed on the pet waste collection apparatus, if desired.

FIGS. 15-18 show an alternate embodiment of a pet waste collection apparatus 60, which is substantially the same as the pet waste collection apparatus 10, except that the pet waste collection apparatus 60 has a tab 62. The tab 62 is adhesively and releasably fastened to the second outermost layer 16. The tab 62 releasably sandwiches the drawstring exit portion 34 of the drawstring 32 between the tab 62 and the second outermost layer 16.

The pet waste collection apparatus 60 is adapted to form the shape of the bag 40 when the tab 62 is released from the second outermost layer 16 and the drawstring 32 is pulled taut. When the drawstring 32 is pulled taut, the pet waste collection apparatus 60 substantially encloses and substantially seals the pet waste 22 that has been received by the pet waste collection apparatus 60.

FIGS. 19-24 show an alternate embodiment of a pet waste collection apparatus 70, which is substantially the same as the pet waste collection apparatus 60, except that the pet waste collection apparatus 70 has a leak protection barrier 72 of non-woven material between outer peripheral border 74 and absorbent pad 76. The leak protection barrier 72 is adapted to further minimize the possibility of leaks from the pet waste collection apparatus 70.

The pet waste collection apparatus 70 has first outermost layer 78, which is heat sealed to second outermost layer 80 at first junction 82 adjacent the absorbent pad 76 and adjacent the leak protection barrier 72. The first outermost layer 78 is also heat sealed to the second outermost layer 80 at second junction 84 adjacent the outer peripheral border 74 and adjacent the leak protection barrier 72. The first outermost layer 78 is also heat sealed to the second outermost layer 80 at third junction 86 adjacent the outer peripheral border 74 and adjacent perimeter 88.

In another preferred embodiment of the present invention, the pet waste collection apparatus has an absorbent pad and an outer peripheral border connected to and adjacent one another and having opposing outermost layers, comprising a permeable outermost layer and a substantially leak proof outermost layer opposing one another, the absorbent pad having a first height and the outer peripheral border having a second height, which is less than the first height of the absorbent pad; the absorbent pad comprising at least one innermost layer of waste absorbing material sandwiched and completely enclosed between the opposing outermost layers and completely filling a volume between the opposing outermost layers extending to the outer peripheral border; the outer peripheral border having an interior passageway between the opposing outermost layers, a draw tape therein, and at least one outside substantially straight cut off corner having adjacent interior passageway openings; the draw tape having a length greater than that of the outer peripheral border; the draw tape routed through the adjacent interior passageway openings exposing the draw tape at the at least one outside substantially straight cut off corner; the waste collection apparatus forming a bag, having any collected waste therein, when the draw tape is pulled taut.

The pet waste collection apparatus may have one or more substantially straight outside cut off corners, each substantially straight outside cut off corner having adjacent interior passageway openings; the draw tape having a length greater than that of the outer peripheral border, the draw tape routed through the adjacent interior passageway openings exposing the draw tape at one or more of the substantially straight outside cut off corners.

It should be noted that the draw tape has a length greater than that of the outer peripheral border; the draw tape being routed through the adjacent interior passageway openings exposing the draw tape at at least one of the substantially straight outside cut off corners.

As a result of the draw tape having a length greater than that of the outer peripheral border, the draw tape extends from at least one of the substantially straight outside cut off corners, facilitating a user to easily grasp the draw tape and pull the draw tape taut to form the bag and enclose any collected waste therein.

The pet waste collection apparatus may also have suitable adhesive strips with peel off protective strips or protective covers or other temporary fasteners to temporarily fasten the pet waste collection apparatus to a floor, when the pet waste collection apparatus is in use.

The pet waste collection apparatus may optionally have scent or odor attractants to attract a pet to the pet waste collection apparatus, and/or optional deodorizers to minimize unwanted smells.

FIGS. 25-30 show an alternate embodiment of a pet waste collection apparatus 100, which is substantially the same as the pet waste collection apparatus 10, except that the pet waste collection apparatus 100 has at least one outside diagonally cut off corner having substantially perpendicular interior passageway openings; the draw tape having a length greater than that of the outer peripheral border, the draw tape routed through the substantially perpendicular interior passageway openings exposing the draw tape at the at least one outside diagonally cut off corner, the draw tape extending from the at least one outside diagonally cut off corner, the waste collection apparatus forming a bag, having any collected waste therein, when the draw tape is pulled taut. The pet waste collection apparatus 100 also has a substantially square absorbent pad having a first height, the outer peripheral border having a second height, which is less than the first height of the substantially square absorbent pad.

In more detail, the pet waste collection apparatus 100 has a substantially square absorbent pad 112 and an outer peripheral border 120 connected to and adjacent one another and having opposing outermost layers, comprising a permeable outermost layer 114 and a substantially leak proof outermost layer 116 opposing one another, the substantially square absorbent pad 112 having a first height 123 and the outer peripheral border 120 having a second height 124, which is less than the first height 123 of the substantially square absorbent pad 112; the substantially square absorbent pad 112 comprising at least one innermost layer 118 of waste absorbing material sandwiched and completely enclosed between the opposing outermost layers and completely filling a volume between the opposing outermost layers extending to the outer peripheral border 120; the outer peripheral border 120 having an interior passageway 126 between the opposing outermost layers, a draw tape 132 therein, and at least one outside diagonally cut off corner 134 having substantially perpendicular interior passageway openings 136; the draw tape 132 having a length greater than that of the outer peripheral border 120; the draw tape 132 routed through the substantially perpendicular interior passageway openings 136 exposing the draw tape 132 at the at least one outside diagonally cut off corner 134; the waste collection apparatus 100 forming a bag 140, having any collected waste 122 therein, when the draw tape 132 is pulled taut.

FIG. 31 shows an alternate embodiment of a pet waste collection apparatus 200, which is substantially the same as the pet waste collection apparatus 100, except that the pet waste collection apparatus 200 has four opposing outside diagonally cut off corners 234, each opposing outside diagonally cut off corner 234 of the four opposing outside diagonally cut off corners 234 having substantially perpendicular interior passageway openings 236, a draw tape 232 having a length greater than that of the outer peripheral border; the draw tape 232 routed through the substantially perpendicular interior passageway openings 236 exposing the draw tape 232 at the each opposing outside diagonally cut off corner 234.

In more detail, the pet waste collection apparatus 200 has a substantially square absorbent pad and an outer peripheral border connected to and adjacent one another and having opposing outermost layers, comprising a permeable outermost layer and a substantially leak proof outermost layer opposing one another, the substantially square absorbent pad having a first height and the outer peripheral border having a second height, which is less than the first height of the substantially square absorbent pad; the substantially square absorbent pad comprising at least one innermost layer of waste absorbing material sandwiched and completely enclosed between the opposing outermost layers and completely filling a volume between the opposing outermost layers extending to the outer peripheral border; the outer peripheral border having an interior passageway between the opposing outermost layers, a draw tape therein, and four opposing outside diagonally cut off corners 234, each opposing outside diagonally cut off corner 234 of the four opposing outside diagonally cut off corners 234 having substantially perpendicular interior passageway openings 236; the draw tape 232 having a length greater than that of the outer peripheral border; the draw tape 232 routed through the substantially perpendicular interior passageway openings 236 exposing the draw tape 232 at the each opposing outside diagonally cut off corner 232; the waste collection apparatus 200 forming a bag, having any collected waste therein, when the draw tape is pulled taut.

The pet waste collection apparatus 100 and/or the pet waste collection apparatus 200 may have one or more outside diagonally cut off corners, each outside diagonally cut off corner having substantially perpendicular interior passageway openings; the draw tape having a length greater than that of the outer peripheral border, the draw tape routed through the substantially perpendicular interior passageway openings exposing the draw tape at one or more of the outside diagonally cut off corners.

It should be noted that the draw tape has a length greater than that of the outer peripheral border; the draw tape being routed through the substantially perpendicular interior passageway openings exposing the draw tape at at least one of the outside diagonally cut off corners.

As a result of the draw tape having a length greater than that of the outer peripheral border, the draw tape extends from at least one of the outside diagonally cut off corners, facilitating a user to easily grasp the draw tape and pull the draw tape taut to form the bag and enclose any collected waste therein.

The permeable outermost layer of the pet waste collection apparatus may be of tissue material or other suitable material, and the substantially leak proof outermost layer may be of PE casting film or other suitable material. The at least one innermost layer of waste absorbing material sandwiched and completely enclosed between the opposing outermost layers and completely filling a volume between the opposing outermost layers may be of non-woven material or other suitable material or combination of suitable materials, such as, for example, a combination of layers of non-woven fabric, which may be quilted, comprising diamond shaped pillow material for extra absorbency, fluff pulp or wood fluff, as a super absorbent material and/or super absorbent polymer high polymer absorbing resin, and tissue material for permeability.

The pet waste collection apparatus may optionally have scent or odor attractants to attract a pet to the pet waste collection apparatus, and/or optional deodorizers to minimize unwanted smells.

Although the present invention has been described in considerable detail with reference to certain preferred versions thereof, other versions are possible. Therefore, the spirit and scope of the appended claims should not be limited to the description of the preferred versions contained herein.

What is claimed is:

1. A pet waste collection apparatus, comprising:
an absorbent pad and an outer peripheral border contiguous to one another and having a common boundary and opposing outermost layers,
said opposing outermost layers comprising a permeable outermost layer and a substantially leak proof outermost layer opposing one another,
said absorbent pad having a greater thickness than that of said outer peripheral border,
said absorbent pad comprising at least one innermost layer of waste absorbing material sandwiched and completely enclosed between said opposing outermost layers and sealed therein at said common boundary,
said at least one innermost layer of waste absorbing material completely filling a volume between said opposing outermost layers extending to said outer peripheral border;
said outer peripheral border having an interior passageway between said opposing outermost layers, a draw tape therein, and a plurality of outside substantially straight cut off corners having adjacent interior passageway openings,
said draw tape having a length greater than that of said outer peripheral border,
said draw tape routed through said interior passageway and through said adjacent interior passageway openings exposing said draw tape at said plurality of outside substantially straight cut off corners;
said waste collection apparatus forming a sheet, having said absorbent pad having said greater thickness than that of said outer peripheral border, when said waste collection apparatus is laid out on a substantially flat surface;

said waste collection apparatus forming a bag, having any collected waste therein, when said draw tape is pulled taut.

2. The pet waste collection apparatus according to claim 1, wherein said draw tape extends from said plurality of outside substantially straight cut off corners.

3. The pet waste collection apparatus according to claim 1, wherein said draw tape extends from one or more of said plurality of outside substantially straight cut off corners.

4. The pet waste collection apparatus according to claim 1, wherein said substantially leak proof outermost layer comprises a plurality of adhesive strips having peel off protective strips.

5. The pet waste collection apparatus according to claim 1, wherein said at least one innermost layer of waste absorbing material comprises non woven material.

6. The pet waste collection apparatus according to claim 5, wherein said non woven material comprises diamond shaped pillow material.

7. A pet waste collection apparatus, comprising:
a substantially square absorbent pad and an outer peripheral border contiguous to one another and having a common boundary and opposing outermost layers,
said opposing outermost layers comprising a permeable outermost layer and a substantially leak proof outermost layer opposing one another,
said substantially square absorbent pad having a greater thickness than that of said outer peripheral border,
said substantially square absorbent pad comprising at least one innermost layer of waste absorbing material sandwiched and completely enclosed between said opposing outermost layers sealed therein at said common boundary,
said at least one innermost layer of waste absorbing material completely filling a volume between said opposing outermost layers extending to said outer peripheral border;
said outer peripheral border having an interior passageway between said opposing outermost layers, a draw tape therein, and a plurality of outside diagonally cut off corners having substantially perpendicular interior passageway openings,
said draw tape having a length greater than that of said outer peripheral border,
said draw tape routed through said interior passageway and through said substantially perpendicular interior passageway openings exposing said draw tape at said plurality of outside diagonally cut off corners;
said waste collection apparatus forming a sheet, having said absorbent pad having said greater thickness than that of said outer peripheral border, when said waste collection apparatus is laid out on a substantially flat surface;
said waste collection apparatus forming a bag, having any collected waste therein, when said draw tape is pulled taut.

8. The pet waste collection apparatus according to claim 7, wherein said draw tape extends from said plurality of outside diagonally cut off corners.

9. The pet waste collection apparatus according to claim 7, wherein said draw tape extends from one or more of said plurality of outside diagonally cut off corners.

10. The pet waste collection apparatus according to claim 7, wherein said substantially leak proof outermost layer comprises a plurality of adhesive strips having peel off protective strips.

11. The pet waste collection apparatus according to claim 7, wherein said at least one innermost layer of waste absorbing material comprises non woven material.

12. The pet waste collection apparatus according to claim 11, wherein said non woven material comprises diamond shaped pillow material.

\* \* \* \* \*